(12) United States Patent
Price

(10) Patent No.: US 12,226,944 B2
(45) Date of Patent: Feb. 18, 2025

(54) SYSTEMS AND METHODS FOR ROTARY BLOW-FILL-SEAL (BFS) MACHINE STAGED VACUUM

(71) Applicant: Koska Family Limited, East Sussex (GB)

(72) Inventor: Jeff Price, Windermere, FL (US)

(73) Assignee: Koska Family Limited, East Sussex (GB)

( * ) Notice: Subject to any disclaimer, the term of this patent is extended or adjusted under 35 U.S.C. 154(b) by 0 days.

(21) Appl. No.: 18/370,929

(22) Filed: Sep. 21, 2023

(65) Prior Publication Data
US 2024/0009911 A1    Jan. 11, 2024

Related U.S. Application Data

(63) Continuation of application No. PCT/US2022/021752, filed on Mar. 24, 2022.
(Continued)

(51) Int. Cl.
| | |
|---|---|
| B29C 49/00 | (2006.01) |
| B29C 49/38 | (2006.01) |
| B29C 49/42 | (2006.01) |
| B29C 49/62 | (2006.01) |
| B65B 3/00 | (2006.01) |
| B65B 3/02 | (2006.01) |
| B65B 47/10 | (2006.01) |
| B29L 31/00 | (2006.01) |

(52) U.S. Cl.
CPC ......... *B29C 49/0029* (2022.05); *B29C 49/38* (2013.01); *B29C 49/42808* (2022.05); *B29C 49/62* (2013.01); *B65B 3/003* (2013.01); *B65B 3/022* (2013.01); *B65B 47/10* (2013.01); *B29C 2049/627* (2013.01); *B29C 2791/006* (2013.01); *B29L 2031/7174* (2013.01)

(58) Field of Classification Search
CPC .......... B29C 49/0029; B29C 49/42808; B29C 49/38; B29C 49/62; B29C 2049/627; B29C 2791/006; B65B 3/003; B65B 3/022; B65B 47/10
See application file for complete search history.

(56) References Cited

U.S. PATENT DOCUMENTS

| | | | | |
|---|---|---|---|---|
| 4,492,551 | A | * | 1/1985 | Hegler ................ B29C 49/4823 264/40.6 |
| 10,940,633 | B2 | | 3/2021 | Schubert |

(Continued)

FOREIGN PATENT DOCUMENTS

| | | |
|---|---|---|
| FR | 1467941 | 2/1967 |
| FR | 2995816 | 3/2014 |

(Continued)

OTHER PUBLICATIONS

International Search Report for Application PCT/US22/21752 dated Jul. 15, 2022; 3 pps.

(Continued)

*Primary Examiner* — Veronica Martin
(74) *Attorney, Agent, or Firm* — Rowan Tree Law Group, PLLC; Carson C. K. Fincham

(57) ABSTRACT

Systems and methods for altering the typical rotary Blow-Fill-Seal (BFS) machine manufacturing process to implement a staged or phased vacuum application to the BFS molds.

15 Claims, 14 Drawing Sheets

Related U.S. Application Data

(60) Provisional application No. 63/169,766, filed on Apr. 1, 2021, provisional application No. 63/164,726, filed on Mar. 23, 2021.

(56) References Cited

U.S. PATENT DOCUMENTS

2016/0243749 A1    8/2016   Sauter
2020/0164563 A1    5/2020   Spallek

FOREIGN PATENT DOCUMENTS

| | | |
|---|---|---|
| GB | 1059454 | 2/1967 |
| WO | 2018028820 | 2/2018 |
| WO | 2022204408 | 9/2022 |

OTHER PUBLICATIONS

Written Opinion for Application PCT/US22/21752 dated Jul. 15, 2022; 5 pps.

* cited by examiner

SYSTEMS AND METHODS FOR ROTARY BLOW-FILL-SEAL (BFS) MACHINE STAGED VACUUM

CROSS-REFERENCE TO RELATED APPLICATIONS

This application is a Continuation Application of PCT Application No. PCT/US22/21752, filed on Mar. 24, 2022 in the name of Price and titled SYSTEMS AND METHODS FOR ROTARY BLOW-FILL-SEAL (BFS) MACHINE STAGED VACUUM, which PCT Application claims benefit of and priority under 35 U.S.C. § 119(e) to, and is a Non-provisional of each of, the following: (i) U.S. Provisional Patent Application No. 63/164,726, filed on Mar. 23, 2021, and titled "SYSTEMS AND METHODS FOR ROTARY BLOW-FILL-SEAL (BFS) MACHINE STAGED VACUUM"; and (ii) U.S. Provisional Patent Application No. 63/169,766, filed on Apr. 1, 2021, and titled "SYSTEMS AND METHODS FOR ROTARY BLOW-FILL-SEAL (BFS) MACHINE STAGED VACUUM." Each of the above-referenced Applications is hereby incorporated by reference herein in its entirety and for all purposes.

BACKGROUND

Blow-Fill-Seal (BFS) manufacturing is an advanced aseptic manufacturing technique first developed in the 1930's which has been utilized to produce various forms of plastic products in the United States since the 1960's. Recently, BFS manufacturing has been utilized to introduce cutting-edge pharmaceutical delivery products such as those offered by ApiJect™ Systems, Inc. of Stamford, CT, which offer many advantages with respect to the standard multi-dose glass vials and separate syringes utilized for medicament storage and delivery.

The basic BFS process includes: (1) vertically extruding a plastic resin to form a tube called a parison, (2) engaging the parison with a multi-part primary mold (to shape desired product receptacles), (3) filling the shaped receptacles with a desired product via filling mandrels, (4) engaging the parison with a multi-part secondary mold (to seal the receptacles; in some cases), and (5) labeling, inspection, packaging, storage, and/or distribution. There are two distinct types of BFS machines currently in use: (i) shuttle machines (e.g., ASEP-TECH® Blow/Fill/Seal machines such as the Model 640 from Weiler™ Engineering, Inc. of Elgin, IL) and (ii) rotary machines (e.g., a Bottelpack™ bp434 and/or Bottelpack™ bp460-20 machine from Rommelag Kunststoff-Maschinen Vertriebsgesellschaft mbH of Waiblingen, Germany). Rotary-style BFS machines offer a much higher throughput than shuttle-style machines, but have limitations that shuttle-style machines may not be subject to. Due to the dynamic motion of the mold components in rotary machines, for example, there is an inherent reduction in the ability to control certain manufacturing parameters.

BRIEF DESCRIPTION OF THE DRAWINGS

The figures depict embodiments for purposes of illustration only. One skilled in the art will readily recognize from the following description that alternative embodiments of the systems and methods illustrated herein may be employed without departing from the principles described herein, wherein.

DETAILED DESCRIPTION

I. Introduction

Figure 1:
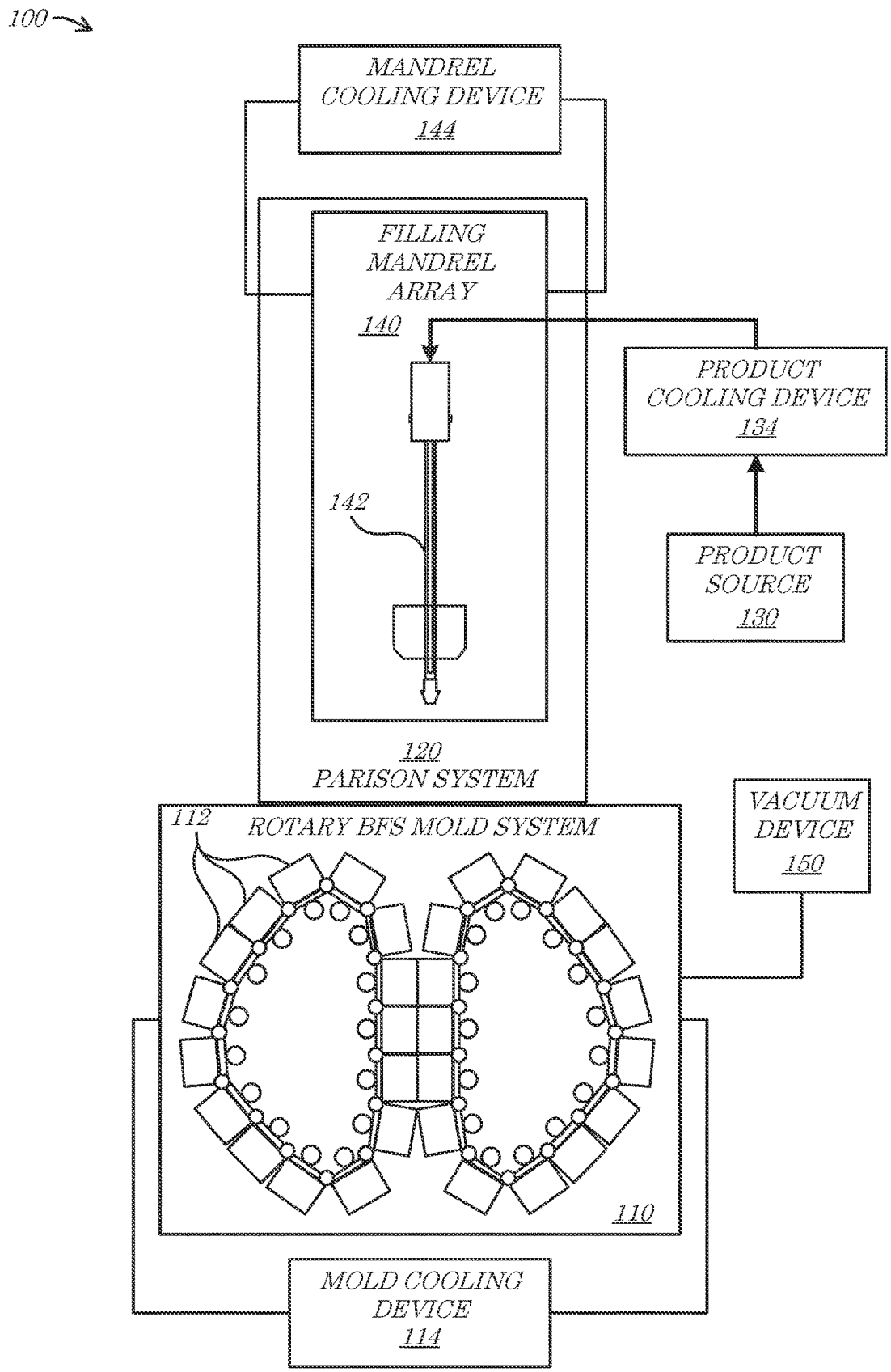
FIG. 1 is a block diagram of a rotary Blow-Fill-Seal (BFS) manufacturing system according to some embodiments.

While rotary Blow-Fill-Seal (BFS) machines offer distinct throughput advantages as compared to other BFS machines such as shuttle-style machines, their speed comes with a sacrifice of flexibility in setting or adjusting various BFS manufacturing parameters. In many cases, desirable production speeds and quality may be achieved utilizing rotary BFS machines despite the lack of flexibility. In certain cases, however, the adjustment of rotary BFS machine manufacturing settings may be a factor in deciding whether a given BFS product design is practicable to produce utilizing a rotary BFS machine. One of the settings for which rotary-style BFS machines lack adequate adjustment ability is the application of vacuum to the BFS molds. While there is some ability to adjust vacuum parameters, it is quite limited due to the nature of the rotary BFS machine process. One reason that adjustment of vacuum parameters is not readily customizable in rotary BFS machines is that most BFS products can be properly formed with default vacuum settings.

Applicant has realized, however, that certain BFS products (and accordingly their respective mold geometries) subjected to the default vacuum settings of rotary BFS machines may be subject to various deficiencies. Certain portions of a BFS product may be formed, for example, with wall thicknesses that are below (e.g., thinner) desired thresholds due to over-application of vacuum forces and/or due to the timing of application of such vacuum forces. According to some embodiments, these and other deficiencies are remedied by providing systems and methods for rotary BFS staged (or phased) vacuum. In some embodiments, for example, the mold holder of a rotary BFS machine is modified to (i) supplement the default or standard vacuum hole with a secondary vacuum hole and/or (ii) re-route the vacuum application paths within the mold holder to create multiple vacuum application stages for a given mold.

According to some embodiments, for example, a first vacuum hole, slot, and/or port may supply and/or apply vacuum to a first portion of the mold (e.g., but only the first portion) while a second vacuum hole, slot, and/or port may supply and/or apply vacuum to a second portion of the mold (e.g., but only the second portion). In such a manner, the mold may be advantageously subjected to multiple (e.g., two or more) time-separated stages of vacuum application that, e.g., are applied to selective portions of the molds. In some embodiments, additional numbers, shapes, and/or sizes of vacuum hole, slot, and/or port may be provided to apply vacuum to multiple different portions of the molds and/or to apply such vacuum in multiple time-separated stages. Such an ability may be capable of providing BFS products at a similar level of customization that is currently only possible to achieve on slower throughput, e.g., shuttle-style, machines. Accordingly, BFS products that benefit from (and/or require) specific vacuum settings for different areas of the BFS mold may be possible to produce in much higher volumes and in much shorter times than were previously possible, by permitting such products to be manufactured on a staged vacuum rotary BFS machine/system, as described herein.

II. Rotary BFS Staged Vacuum Manufacturing Systems

Referring initially to FIG. 1, a block diagram of a rotary BFS manufacturing system 100 according to some embodiments is shown. The term "rotary" with respect to BFS manufacturing and BFS manufacturing machines and processes general refers to BFS machines and processes in which the parison remains continuous (e.g., is not cut) between cycles/product "cards". There are two (2) primary types of rotary BFS machines: (i) carousel machines such as the Bottelpack™ bp460-20 machine from Rommelag Kunststoff-Maschinen Vertriebsgesellschaft mbH of Waiblingen, Germany, that utilize counter-rotating chains of cooperative mold halves and (ii) hybrid machines such as the Bottelpack™ bp434 machine from Rommelag Kunststoff-Maschinen Vertriebsgesellschaft mbH of Waiblingen, Germany, that utilize a single set of cooperative mold halves. In some embodiments, the rotary BFS manufacturing system 100 may comprise either a carousel or hybrid style machine. For ease of illustration herein, the rotary BFS manufacturing system 100 is depicted and described as a carousel style rotary BFS machine/process.

The rotary BFS manufacturing system 100 may comprise, for example, a rotary BFS mold system 110 that is configured to dynamically rearrange (e.g., in a rotary manner) a plurality of corresponding mold halves 112. While not explicitly detailed in FIG. 1, in some embodiments each respective set of mold halves 112 may be configured to form a primary portion of a desired BFS product/receptacle (such as a fluid reservoir structure; not shown in FIG. 1) and a secondary portion of the BFS products, such as a neck and/or seal thereof, e.g., in a rotational sequence. The mold halves 112 may be carried by and/or coupled to respective mold holders (not separately shown). In some embodiments, the rotary BFS manufacturing system 100 may comprise a mold cooling device 114 that is coupled to provide cooling (e.g., remove heat from) the rotary BFS mold system 110 (and/or the mold halves 112 thereof).

According to some embodiments, the mold halves 112 may engage with a product stream (not shown in FIG. 1) such as a parison (not shown in FIG. 1) extruded and/or formed by a parison system 120 of the rotary BFS manufacturing system 100 to form BFS products (not separately shown in FIG. 1). According to some embodiments, the rotary BFS manufacturing system 100 may comprise a product source 130 such as a liquid product reservoir that provides fill product (e.g., a medicament such as a vaccine) to a product cooling device 134. In some embodiments, the fill product may be provided from the product cooling device 134 to (or through) a filling mandrel array 140. The filling mandrel array 140 may comprise, for example, a plurality of filling needles or mandrels 142 coupled to be automatically engaged with the rotary BFS mold system 110 to fill the formed BFS products before they are sealed.

In some embodiments, the filling mandrel array 140 (and/or the mandrels 142 thereof) may be coupled to a mandrel cooling device 144. The mandrel cooling device 144 may, for example, be coupled to provide cooling (e.g., remove heat from) the filling mandrel array 140 (and/or the mandrels 142 thereof). In some embodiments, the rotary BFS manufacturing system 100 may comprise a vacuum device 150, e.g., coupled to and/or in communication with the rotary BFS mold system 110. While the BFS manufacturing process is commonly referred to as "Blow-Fill-Seal", for example, BFS product processes may utilize blown air and/or vacuum to engage the parison with the cavities (not separately shown) of the cooperative mold halves 112. The vacuum device 150 may comprise, for example, a vacuum pump, vacuum tubes, fittings, hoses, and/or connections that are coupled to selectively apply vacuum force to the mold halves 112 (e.g., drawing the parison material into the cavities) of the rotary BFS mold system 110.

Fewer or more components 110, 112, 114, 120, 130, 134, 140, 142, 144, 150 and/or various configurations of the depicted components 110, 112, 114, 120, 130, 134, 140, 142, 144, 150 may be included in the rotary BFS manufacturing system 100 without deviating from the scope of embodiments described herein. In some embodiments, the components 110, 112, 114, 120, 130, 134, 140, 142, 144, 150 may be similar in configuration and/or functionality to similarly named and/or numbered components as described herein. In some embodiments, the rotary BFS manufacturing system 100 (and/or portion thereof) may comprise a carousel or hybrid rotary style BFS machine, system, and/or platform programmed and/or otherwise configured to execute (e.g., via a computerized controller device; not shown), conduct, and/or facilitate methods described herein such as the rotary BFS staged vacuum method 400 of FIG. 4 herein, or portions thereof.

Figure 2:
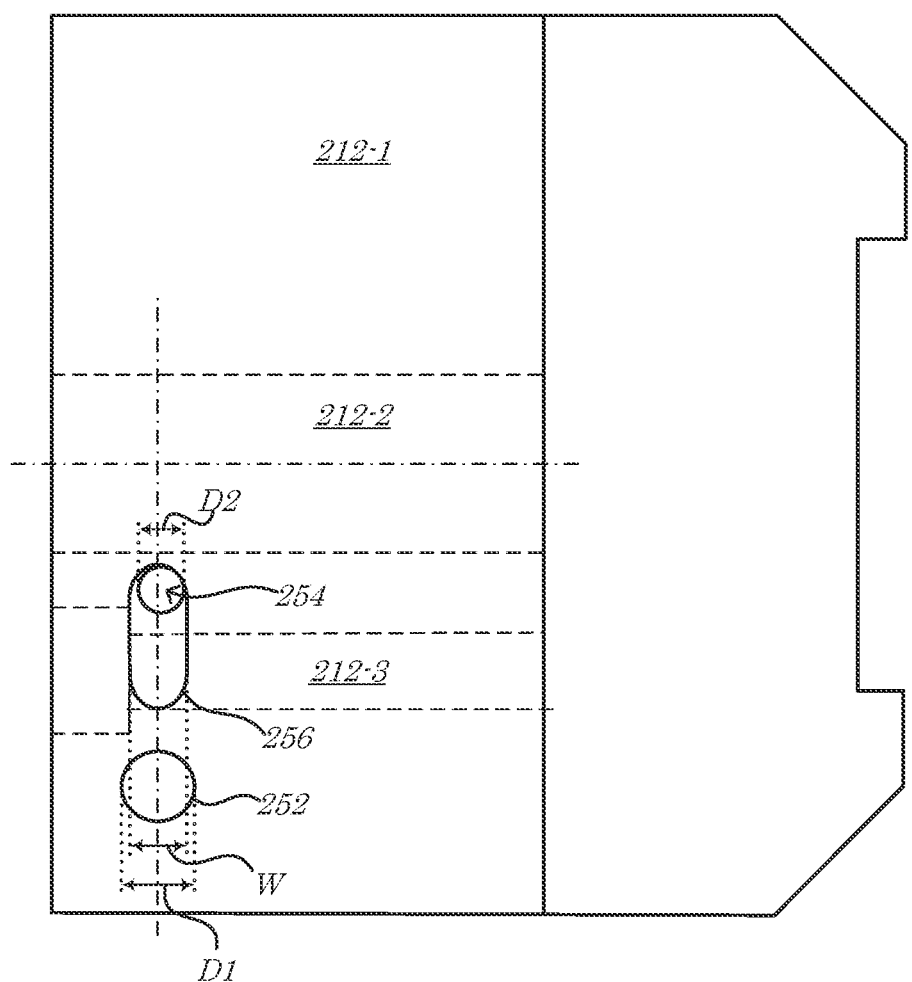
FIG. 2 is a side view of a rotary-style BFS machine mold holder according to some embodiments.

Turning to FIG. 2, a side view of a rotary-style BFS machine mold holder 212 according to some embodiments is shown. While the term "mold holder" is utilized for convenience and ease of illustration, in some embodiments, the mold holder 212 may comprise only a mold half and/or a combined mold half and mold holder (e.g., with elements of what would typically be a holder and a mold half jointly incorporated therein—e.g., a unibody or integral design). The mold holder 212 may comprise, in some embodiments, a mold holder end body 212-1 through which a bushing hole 212-2 and/or a screw/bolt hole 212-3 are disposed. As depicted, the bushing hole 212-2 and the screw/bolt hole 212-3 may pass transversely through the mold holder end body 212-1 (e.g., from right to left as shown). In some embodiments, the mold holder 212 may comprise and/or define a standard or primary vacuum hole 252. In a typical BFS mold holder (not shown), vacuum may be applied via the primary vacuum hole 252 to all areas of the mold half at the same time. In typical rotary BFS mold holding systems, and as depicted in FIG. 2 in accordance with some embodiments, the primary vacuum hole 252 is disposed below the screw/bolt hole 212-3 along a vertical axis and having a first diameter "D1".

According to some embodiments, the mold holder 212 may comprise a secondary or "late" vacuum hole 254 disposed in and/or defined by the mold holder end body 212-1. As depicted, the late vacuum hole 254 may be comprise a second diameter "D2" and may be disposed between the screw/bolt hole 212-3 and the bushing hole 212-2. In some embodiments, the second diameter "D2" may be smaller than the first diameter "D1". In some embodiments, the mold holder 212 may comprise a secondary or "late" vacuum slot 256 in communication with the late vacuum hole 254. According to some embodiments, the late vacuum slot 256 may comprise a width "W". The late vacuum slot 256 may be centered along the axis of the primary vacuum hole 252 or may be offset therefrom. The width "W" may be equal to the first diameter "D1" or may be smaller (as depicted) or larger than the first diameter "D1". In some embodiments, the width "W" may be greater than the second diameter "D2" and/or the late vacuum hole 254 may be disposed within and/or coincidentally with the late vacuum slot 256 either centrally aligned along the axis or offset (as depicted). According to some embodiments, the presence of the late vacuum hole 254 and/or the late vacuum slot 256 may permit various stages of vacuum to be effectively scheduled for different portions of a rotary-style BFS molding process.

In some embodiments, for example, each of the primary vacuum hole 252 and the late vacuum hole 254 may be in communication with one or more vacuum channels (not shown) internal to the mold holder 212 that, e.g., are in communication with various portions of the mold half (e.g., different cavities and/or portions; not shown). According to some embodiments, the primary vacuum hole 252 may be in communication with a first internal vacuum channel that supplies vacuum to a first portion of the mold half and the late vacuum hole 254 may be in communication with a second internal vacuum channel that supplies vacuum to a second portion of the mold half. In some embodiments, the late vacuum slot 256 may not extend into the mold holder 212 as far as the late vacuum hole 254. The late vacuum slot 256 may extend from the mold holder end body 212-1 and/or surface and into the mold holder to a first depth (not shown), for example, while the late vacuum hole 254 extends deeper into (and/or through) the mold holder 212 and provides communication between the late vacuum slot 256 and the second portion of the mold half. In such a manner, for example, the late vacuum slot 256 may not extend deep enough into the mold holder 212 to interfere or intersect with the screw/bolt hole 212-3.

Fewer or more components 212-1, 212-2, 212-3, 252, 254, 256 and/or various configurations of the depicted components 212-1, 212-2, 212-3, 252, 254, 256 may be included in the mold holder 212 without deviating from the scope of embodiments described herein. In some embodiments, the components 212-1, 212-2, 212-3, 252, 254, 256 may be similar in configuration and/or functionality to similarly named and/or numbered components as described herein. In some embodiments, the mold holder 212 may comprise a portion of a carousel or hybrid rotary style BFS machine, system, and/or platform programmed and/or otherwise configured to execute (e.g., via a computerized controller device; not shown), conduct, and/or facilitate methods described herein such as the rotary BFS staged vacuum method 400 of FIG. 4 herein, or portions thereof.

Referring now FIG. 3A, FIG. 3B, FIG. 3C, FIG. 3D, FIG. 3E, FIG. 3F, and FIG. 3G, sequential side views of a portion of a rotary-style BFS system 300 according to some embodiments are shown. The sequential side views show, for example, how operation of the portion of the rotary-style BFS system 300 may cause staged engagement of vacuum to cooperative pairs of mold holders (and/or mold halves) 312-La, 312-Lb, 312-Ra, 312-Rb. With initial reference to FIG. 3A, the portion of the rotary-style BFS system 300 is depicted at a first time. While both a first pair of mold holders/mold halves 312-La, 312-Ra and a second pair of mold holders/mold halves 312-Lb, 312-Rb are depicted in accordance with a carousel style rotary BFS machine, a hybrid-style rotary BFS machine configuration may alternatively be utilized without deviating from the scope of some embodiments. Accordingly, the mold holder/mold half 312-La, 312-Lb, 312-Ra, 312-Rb movement arrows in the figures are provided for reference only and may differ in the case that different configurations of the portion of the rotary-style BFS system 300 are utilized.

In some embodiments, the first pair of mold holders/mold halves 312-La, 312-Ra may comprise a first left mold holder 312-La and a first right mold holder 312-Ra. According to some embodiments, each of the first mold holders 312-La, 312-Ra may comprise a primary vacuum hole 352-L, 352-R, a secondary (or "late") vacuum hole 354-L, 354-R, and/or a secondary (or "late") vacuum slot 356-L, 356-R. As depicted, for example, each primary vacuum hole 352-L, 352-R may be disposed proximate to a lower inner corner of the respective first mold holder 312-La, 312-Ra. According to some embodiments, the primary vacuum holes 352-L, 352-R may be in communication with a first region "A" of the mold halves/cavities (themselves not separately shown). In some embodiments, each secondary vacuum hole 354-L, 354-R may be offset vertically from and/or disposed above the corresponding primary vacuum hole 352-L, 352-R of the respective first mold holder 312-La, 312-Ra. According to some embodiments, the secondary vacuum holes 354-L, 354-R may be in communication with a second region "B" of the mold halves/cavities.

Figure 3A:
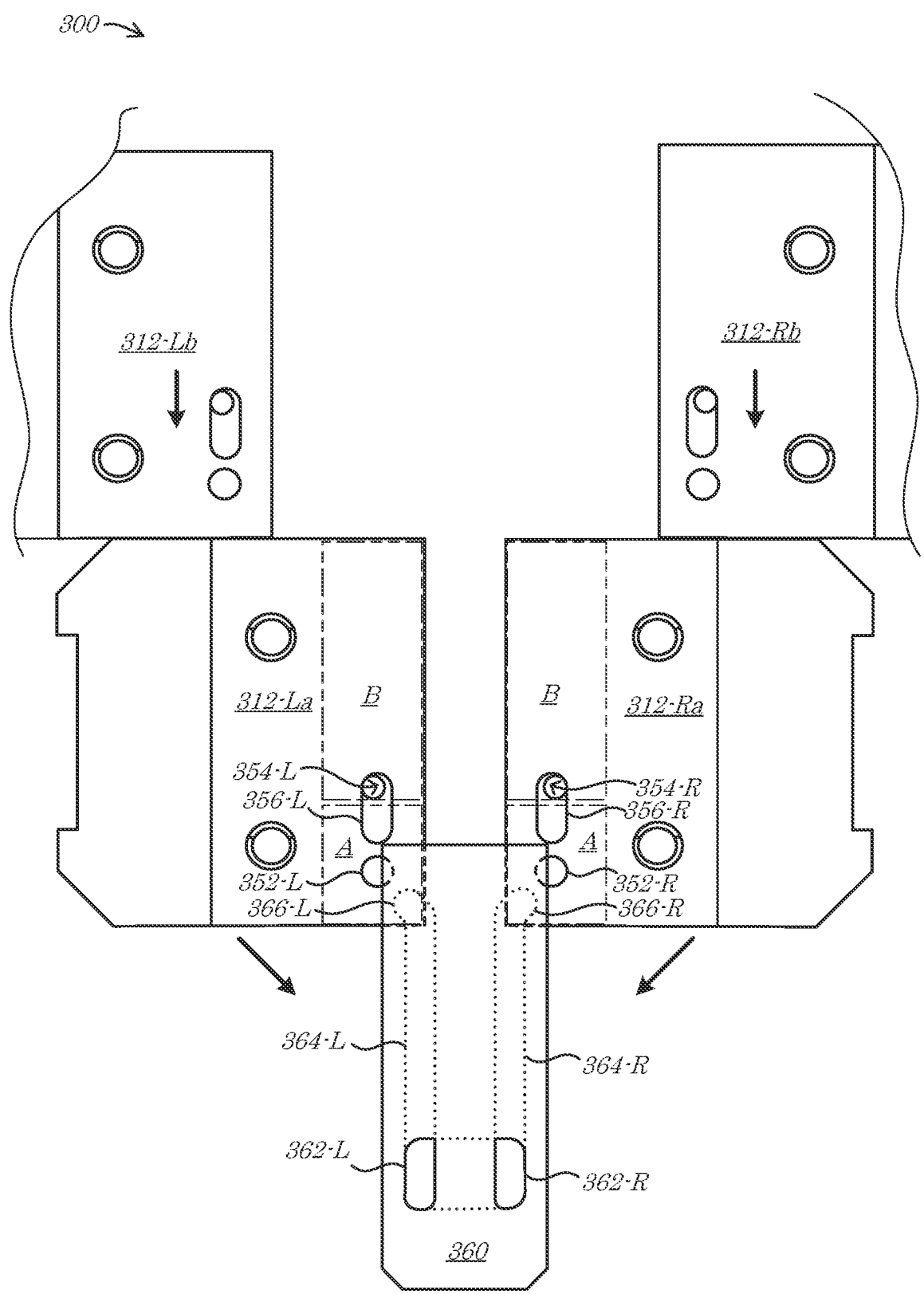
FIG. 3A, FIG. 3B, FIG. 3C, FIG. 3D, FIG. 3E, FIG. 3F, and FIG. 3G are sequential side views of a portion of a rotary-style BFS system according to some embodiments.

According to some embodiments, the portion of the rotary-style BFS system 300 may comprise a vacuum slider 360 that is coupled to provide (or apply) vacuum to the first mold holders 312-La, 312-Ra (and eventually to the second pair of mold holders 312-Lb, 312-Rb as they cycle to meet the vacuum slider 360). The vacuum slider 360 may comprise, for example, one or more vacuum ports 362-L, 362-R in communication with one or more vacuum slots 364-L, 364-R. In some embodiments, the vacuum slider 360 may comprise symmetrical and/or mirrored vacuum ports 362-L, 362-R and/or vacuum slots 364-L, 364-R, with a left vacuum port 362-L and a left vacuum slot 364-L selectively providing vacuum to the first left mold holder 312-La and with a right vacuum port 362-R and a right vacuum slot 364-R selectively providing vacuum to the first right mold holder 312-Ra. As depicted, in some embodiments vacuum may be applied to the facing side of the vacuum slider 360 via the vacuum ports 362-L, 362-R and may be directed to an opposing face (hidden) via the vacuum slots 364-L, 364-R. Accordingly, as depicted in FIG. 3A at the first time, vacuum is not yet applied to either of the first mold holders 312-La, 312-Ra or the respective first and second regions "A", "B", thereof.

Figure 3B:
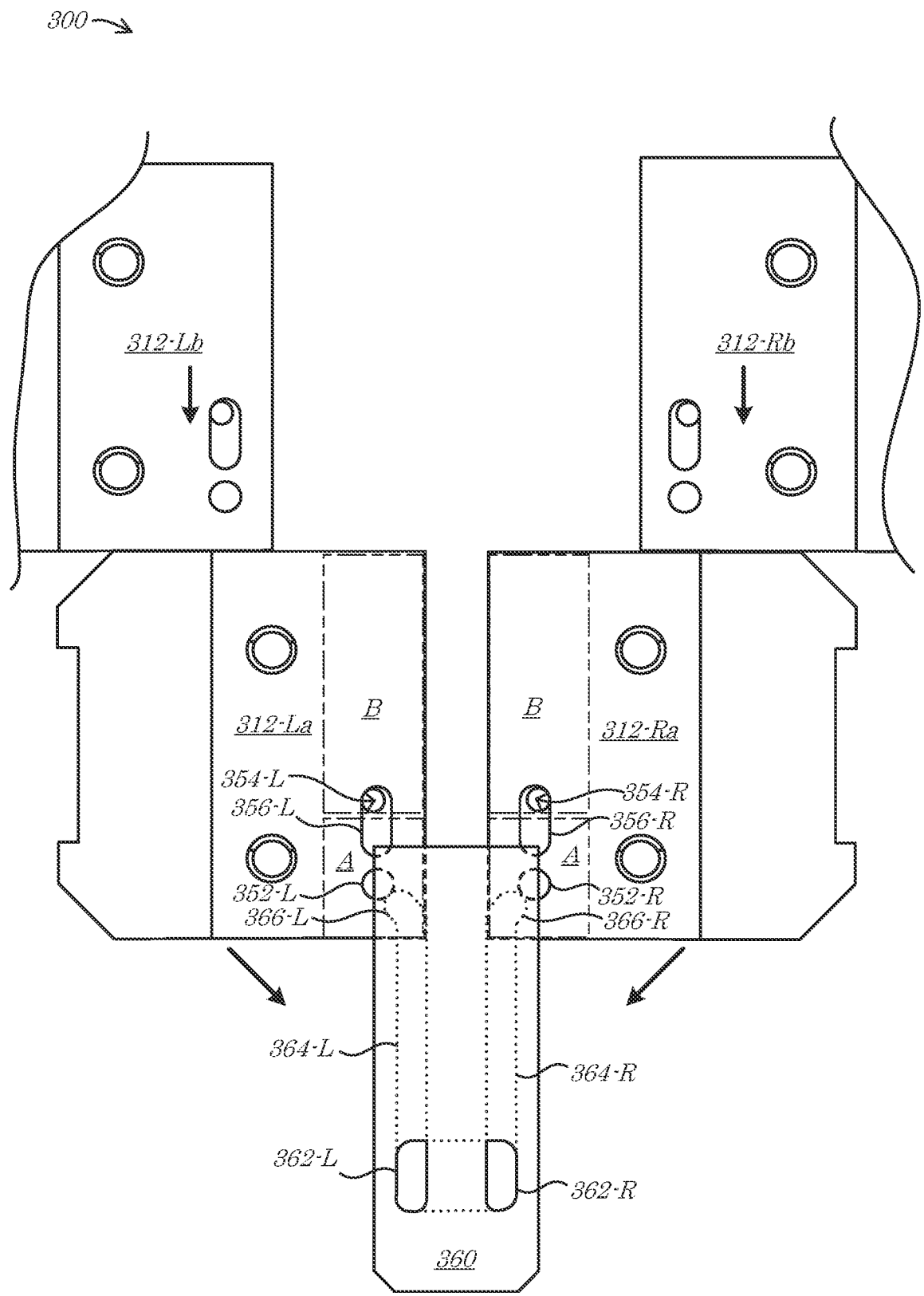
Figure 3C:
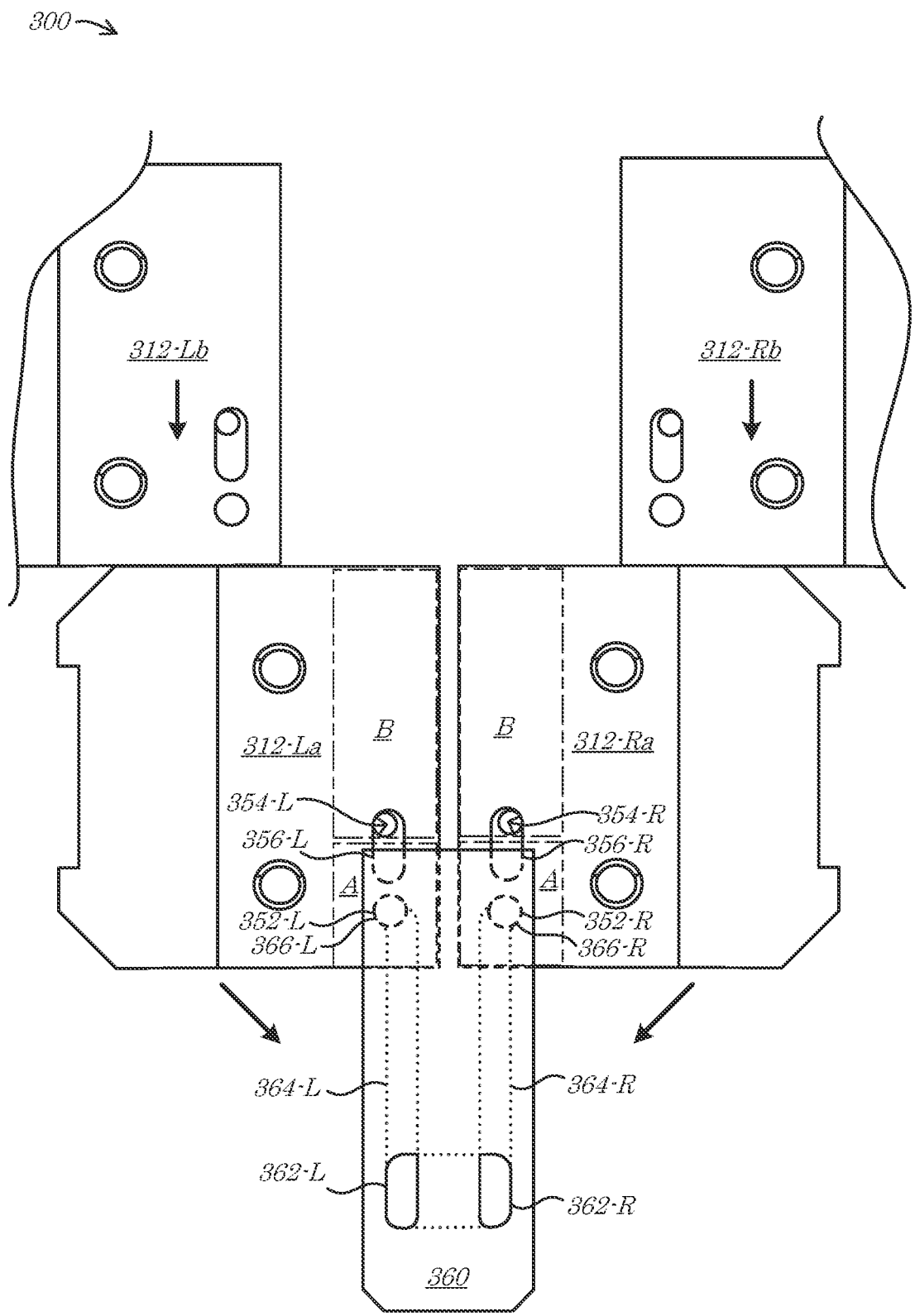

With reference to FIG. 3B, the portion of the rotary-style BFS system 300 is depicted at a second time in which the first mold holders 312-La, 312-Ra have progressed in their cycle to a point just before vacuum is applied. As depicted, for example, respective angled portions 366-L, 366-R of the vacuum slots 364-L, 364-R have become disposed (e.g., by movement of the first mold holders 312-La, 312-Ra) adjacent to the primary vacuum holes 352-L, 352-R but have not yet become in communication therewith. As the movement of the first mold holders 312-La, 312-Ra progresses, and with reference to FIG. 3C that depicts the portion of the rotary-style BFS system 300 at a third time, the primary vacuum holes 352-L, 352-R have come into communication with the angled portions 366-L, 366-R of the vacuum slots 364-L, 364-R and vacuum has now accordingly been applied/supplied to the first regions "A" of the first mold holders 312-La, 312-Ra and/or mold halves thereof. This "first stage" or phase of vacuum may, for example, be applied to portions of the mold halves/cavities that are disposed within the first regions "A". According to some embodiments, and as depicted in FIG. 3C, the second regions "B" of the mold halves/cavities are not yet in communication with the vacuum source supplied by the vacuum slider 360 (e.g., at the third time).

In some embodiments, the length and/or geometry of the vacuum slots 364-L, 364-R (e.g., and/or the angled portions 366-L, 366-R thereof) may be configured to adjust the timing of application of the various vacuum stages. As depicted in FIG. 3C, for example, the first stage of vacuum has been selectively applied at the third time during the rotary BFS cycle (having begun slightly before the third time and immediately after the second time, actually, as the vacuum slots 364-L, 364-R first became in communication with the primary vacuum holes 352-L, 352-R—a time that is not depicted), which comprises a time just before the closing/meeting of the first mold holders 312-La, 312-Ra and/or mold halves thereof. In such a configuration, for example, parison (not shown) may begin to be pulled into the mold half cavities in the first regions "A" just before the mold halves are mated/closed. An amount of time between the first stage of vacuum application and the closing of the mold halves may be configured based on the selected geometry of the vacuum slots 364-L, 364-R and/or the angled portions 366-L, 366-R thereof. The longer the designed length of the angled portions 366-L, 366-R is, for example, the longer the length of time between the onset of the first stage of vacuum and the closing of the mold halves.

Figure 3D:
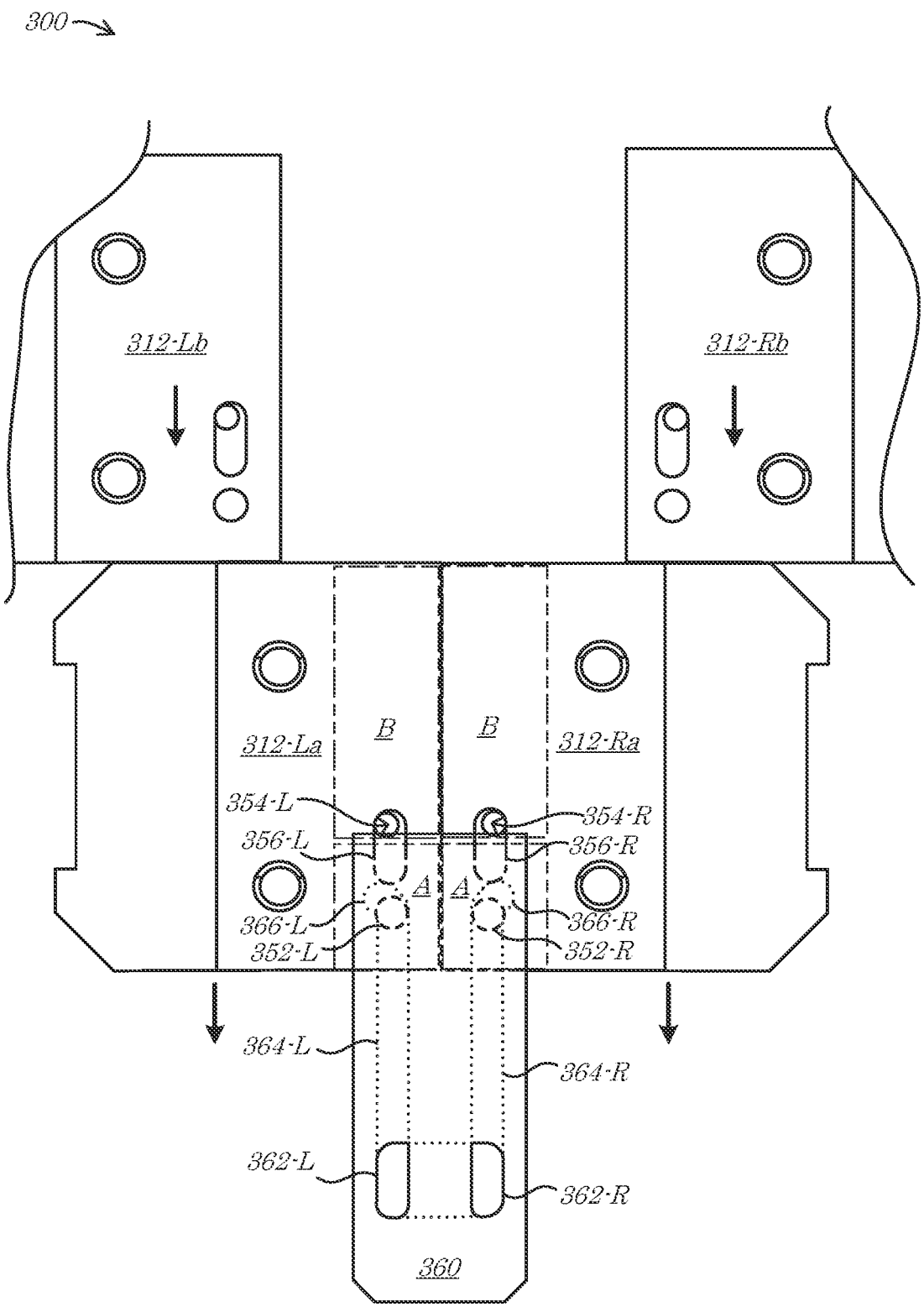

According to some embodiments, and with reference to FIG. 3D, the portion of the rotary-style BFS system 300 is depicted at a fourth time in which the first mold holders 312-La, 312-Ra and/or mold halves thereof have been mated and/or closed, the first stage of vacuum continues to be applied to the first regions "A" via the primary vacuum holes 352-L, 352-R, and the second regions "B" have still not been subjected to vacuum. As depicted, for example, the angled portions 366-L, 366-R of the vacuum slots 364-L, 364-R have become disposed (e.g., by movement of the first mold holders 312-La, 312-Ra) adjacent to the secondary vacuum slots 356-L, 356-R, but have not yet become in communication therewith. As the movement of the first mold holders 312-La, 312-Ra continues to progress (now predominately vertically downward, as the mold haves have already been closed horizontally), and with reference to FIG. 3E that depicts the portion of the rotary-style BFS system 300 at a fifth time, the secondary vacuum slots 356-L, 356-R have come into communication with the angled portions 366-L, 366-R of the vacuum slots 364-L, 364-R and vacuum has now accordingly been applied/supplied to the second regions "B" of the first mold holders 312-La, 312-Ra and/or mold halves thereof (e.g., via the communication between the secondary vacuum slots 356-L, 356-R and the secondary vacuum holes 354-L, 354-R). This "second stage", "late stage", or phase of vacuum may, for example, be applied to portions of the mold halves/cavities that are disposed within the second regions "B".

Figure 3E:
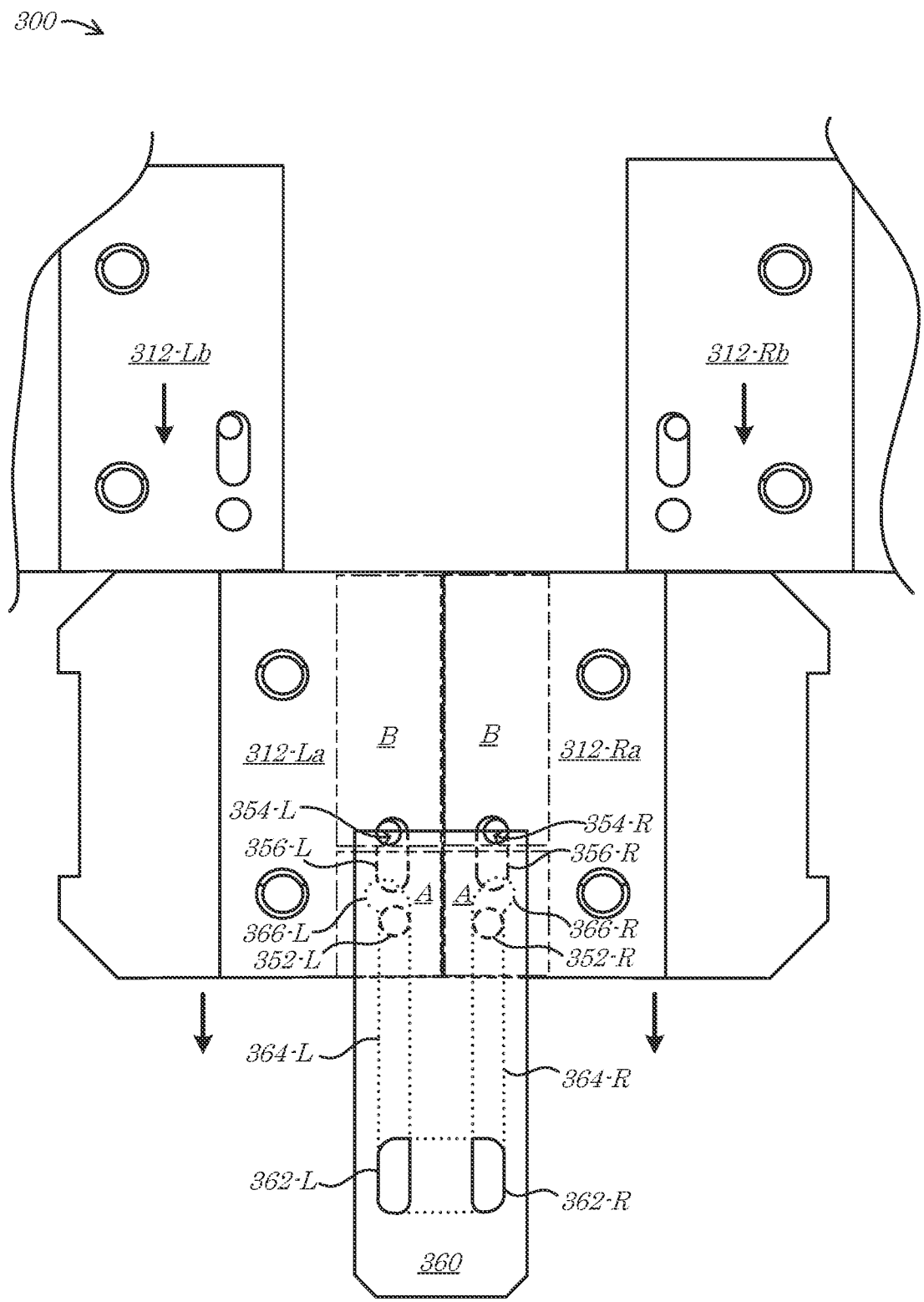

In some embodiments, the length and/or geometry of the vacuum slots 364-L, 364-R (e.g., and/or the angled portions 366-L, 366-R thereof) and/or the secondary vacuum slots 356-L, 356-R may be configured to adjust the timing of application of the second or late stage of vacuum. As depicted in FIG. 3E, for example, the second/late stage of vacuum has been selectively applied at the fifth time during the rotary BFS cycle, which comprises a time delayed from the fourth time based on the speed of movement of the first mold holders 312-La, 312-Ra, the geometry of the vacuum slots 364-L, 364-R (and/or the angled portions 366-L, 366-R thereof), and the geometry (e.g., length) of the secondary vacuum slots 356-L, 356-R. In embodiments where the length of the secondary vacuum slots 356-L, 356-R is shorter than depicted in FIG. 3E, for example, the length of time between the onset of the first stage of vacuum and the onset of the second/late stage of vacuum may be longer.

Figure 3F:
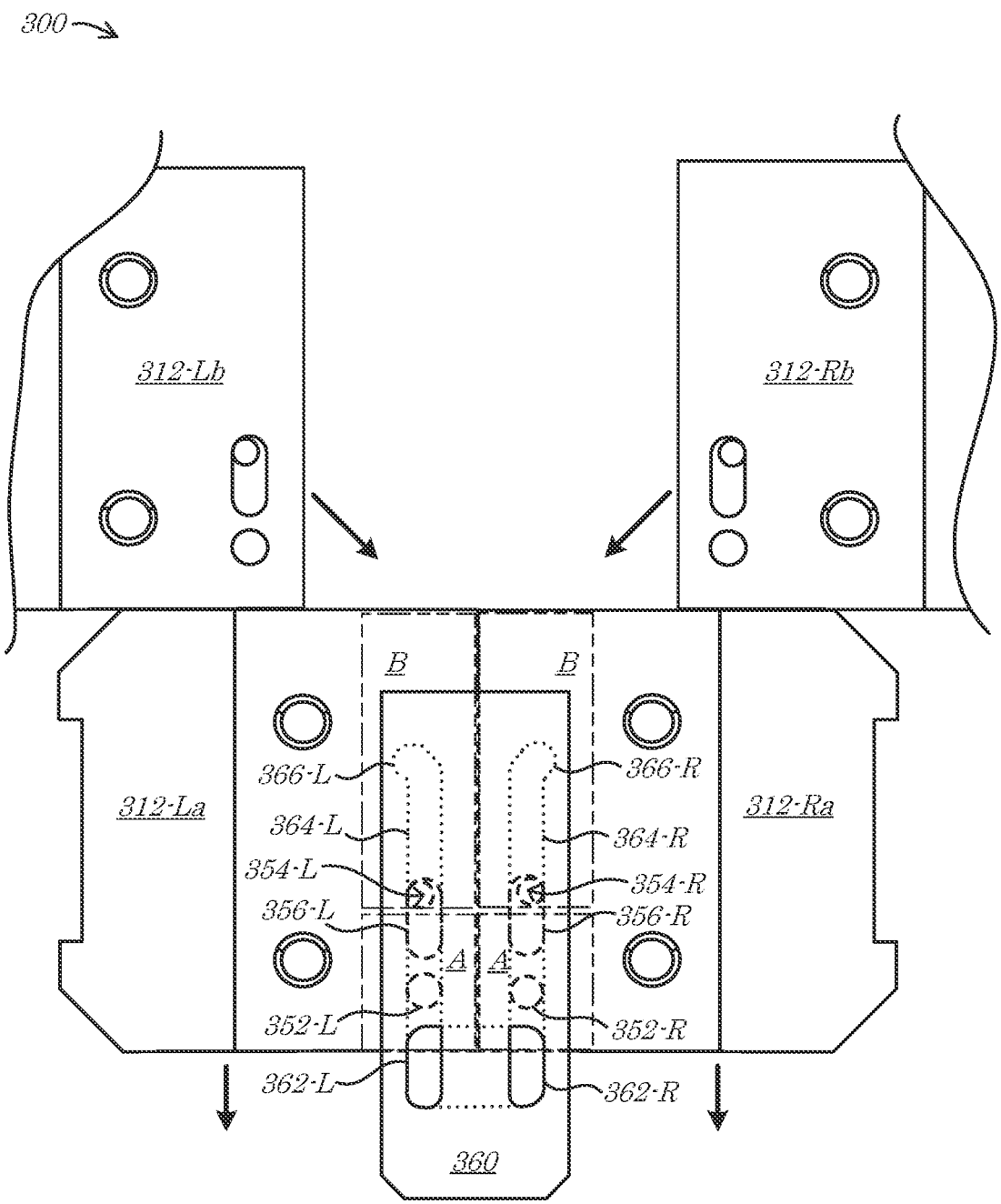
Figure 3G:
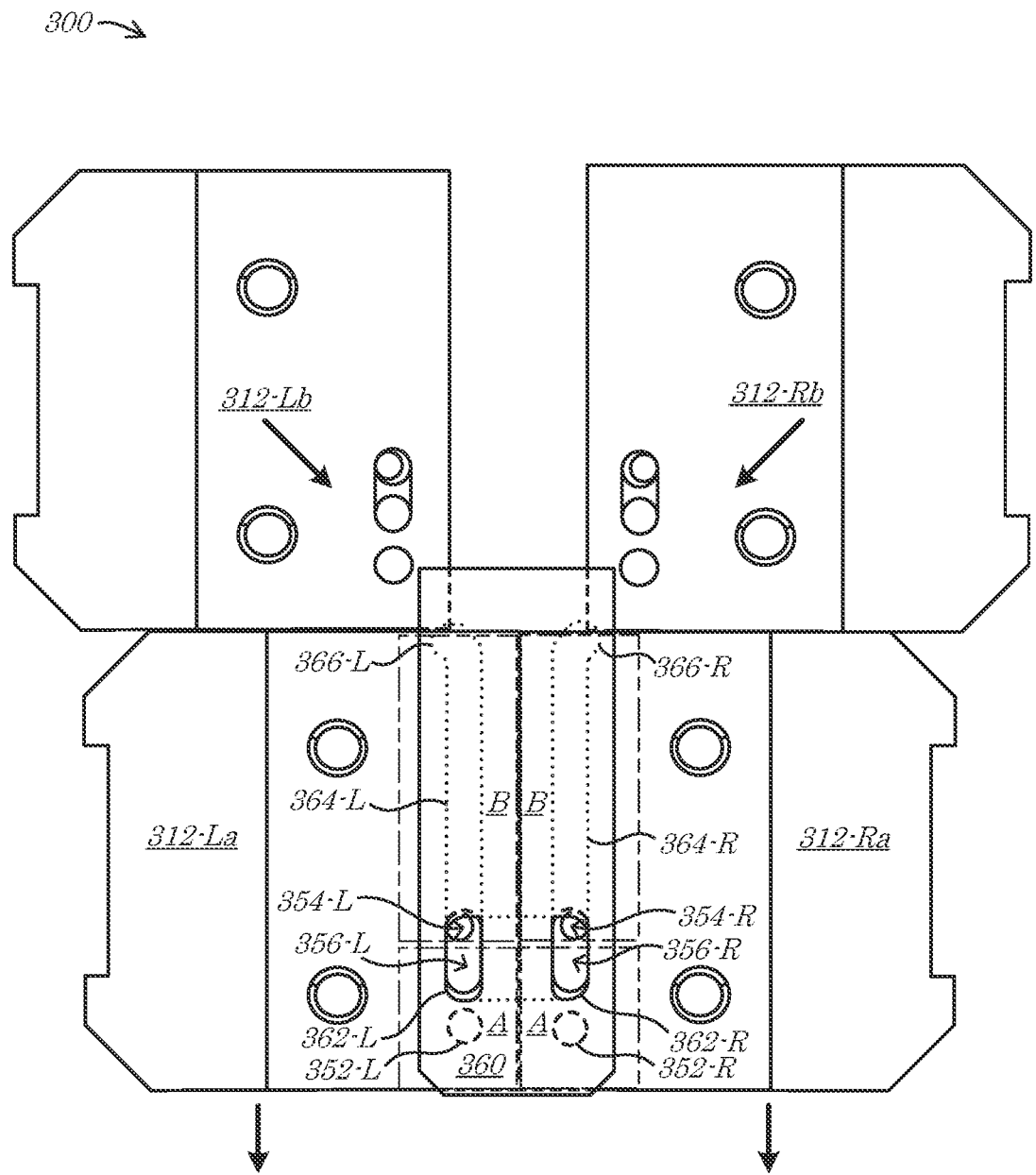

According to some embodiments, and with reference to FIG. 3F in which the portion of the rotary-style BFS system 300 is depicted at a sixth time, both stages of vacuum may continue to be applied to both regions "A" and "B" as the closed first mold holders 312-La, 312-Ra and/or mold halves thereof continue to progress through their cycle (e.g., during a filling of the formed BFS products with medical fluids; not shown). In some embodiments, such as in the example carousel arrangement depicted in the portion of the rotary-style BFS system 300, the second mold holders 312-Lb, 312-Rb may begin to move inward/close to advance toward the vacuum slider 360. As the movement of the first mold holders 312-La, 312-Ra (and the second mold holders 312-Lb, 312-Rb) progresses, and with reference to FIG. 3G that depicts the portion of the rotary-style BFS system 300 at a seventh time, the primary vacuum holes 352-L, 352-R have been moved out of communication with the vacuum slots 364-L, 364-R and the first stage of vacuum has accordingly ended (e.g., vacuum is no longer applied to the first regions "A"). At the seventh time, the second/late stage of vacuum continues to be applied, but as the secondary vacuum holes 354-L, 354-R and secondary vacuum slots 356-L, 356-R are nearing the end of their communication with the vacuum slots 364-L, 364-R, the second/late stage of vacuum is nearing an end. Also at the seventh time, the second mold holders 312-Lb, 312-Rb have continued to advance through their cycle and are becoming proximate to the angled portions 366-L, 366-R of the vacuum slots 364-L, 364-R which will, at a later time (not shown) supply vacuum to the second mold holders 312-Lb, 312-Rb.

In some embodiments, the length and/or geometry of the vacuum slots 364-L, 364-R (e.g., and/or the angled portions 366-L, 366-R thereof) may be configured to adjust the timing between the application of the vacuum stages to the first mold holders 312-La, 312-Ra and the application of the vacuum stages to the second mold holders 312-Lb, 312-Rb. If it is desired to end the second/late stage of vacuum to the first mold holders 312-La, 312-Ra before a first stage of vacuum begins to be applied to the second mold holders 312-Lb, 312-Rb, for example, the length of the vacuum slots 364-L, 364-R (e.g., and/or the angled portions 366-L, 366-R thereof) may be configured to ensure that the secondary vacuum holes 354-L, 354-R and secondary vacuum slots 356-L, 356-R are removed from communication with the vacuum slots 364-L, 364-R before the vacuum slots 364-L, 364-R (e.g., and/or the angled portions 366-L, 366-R thereof) begin supplying/applying vacuum to the second mold holders 312-Lb, 312-Rb. According to some embodiments, such as in the case that the second regions "B" of the first mold holders 312-La, 312-Ra form a first portion of a BFS product and a first regions "A" (not shown) of the second mold holders 312-Lb, 312-Rb form a second portion of the same BFS product, it may be desirable to continue the second/late stage of vacuum of the second regions "B" of the first mold holders 312-La, 312-Ra such that it at least partially overlaps with an onset of a first stage of vacuum supplied to the first regions "A" of the second mold holders 312-Lb, 312-Rb—e.g., to maintain constant vacuum over the entire formation of a single BFS product (or single set of BFS products formed together). In such embodiments, the length of the vacuum slots 364-L, 364-R (and/or the angled portions 366-L, 366-R thereof) may be configured to be long enough so that, based on the geometry/dimensions of the first mold holders 312-La, 312-Ra and the second mold holders 312-Lb, 312-Rb, the vacuum slots 364-L, 364-R may extend to be in communication with both of the secondary vacuum holes 354-L, 354-R (and/or secondary vacuum slots 356-L, 356-R) and vacuum components (not labeled) of the second mold holders 312-Lb, 312-Rb, at the same time.

According to some embodiments, different numbers, shapes, and/or sizes of vacuum holes 352-L, 352-R, 352-L, 352-R and/or slots 356-L, 356-R may be provided to apply vacuum to multiple different portions (e.g., regions "A" and/or "B") of the molds and/or to apply such vacuum in multiple stages. Such an ability may enable the manufacturing of BFS products at a level of customization that is currently only possible (if at all) to achieve on slower throughput, e.g., shuttle-style, machines. Accordingly, BFS products that benefit and/or require specific vacuum settings for different areas of the BFS mold may be possible to produce in much higher volumes and in much shorter times than were previously possible, by permitting such BFS products to be manufactured on a BFS machine (not wholly shown) comprising the portion of the rotary-style BFS system 300 as depicted.

Fewer or more components 312-La, 312-Lb, 312-Ra, 312-Rb, 352-L, 252-R, 354-L, 354-R, 356-L, 356-R, 360, 362-L, 362-R, 364-L, 364-R, 366-L, 366-R and/or various configurations of the depicted components 312-La, 312-Lb, 312-Ra, 312-Rb, 352-L, 252-R, 354-L, 354-R, 356-L, 356-R, 360, 362-L, 362-R, 364-L, 364-R, 366-L, 366-R may be included in the portion of the rotary-style BFS system 300 without deviating from the scope of embodiments described herein. In some embodiments, the components 312-La, 312-Lb, 312-Ra, 312-Rb, 352-L, 252-R, 354-L, 354-R, 356-L, 356-R, 360, 362-L, 362-R, 364-L, 364-R, 366-L, 366-R may be similar in configuration and/or functionality to similarly named and/or numbered components as described herein. In some embodiments, the portion of the rotary-style BFS system 300 may comprise a portion of a carousel or hybrid rotary style BFS machine, system, and/or platform programmed and/or otherwise configured to execute (e.g., via a computerized controller device; not shown), conduct, and/or facilitate methods described herein such as the rotary BFS staged vacuum method 400 of FIG. 4 herein, or portions thereof.

III. Rotary BFS Staged Vacuum Manufacturing Methods

Figure 4:
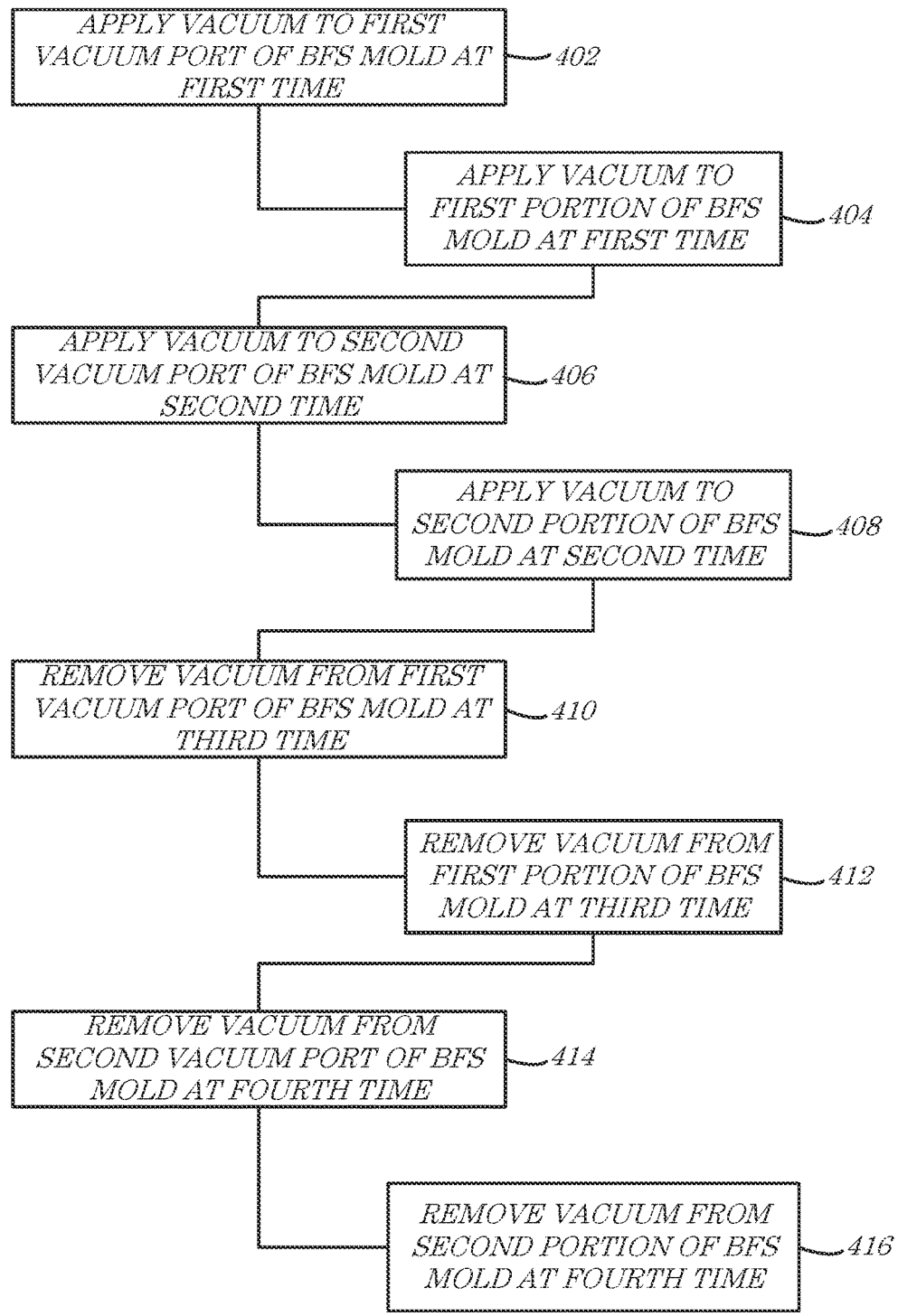
FIG. 4 is a flow diagram of a method according to some embodiments.
Figure 5:
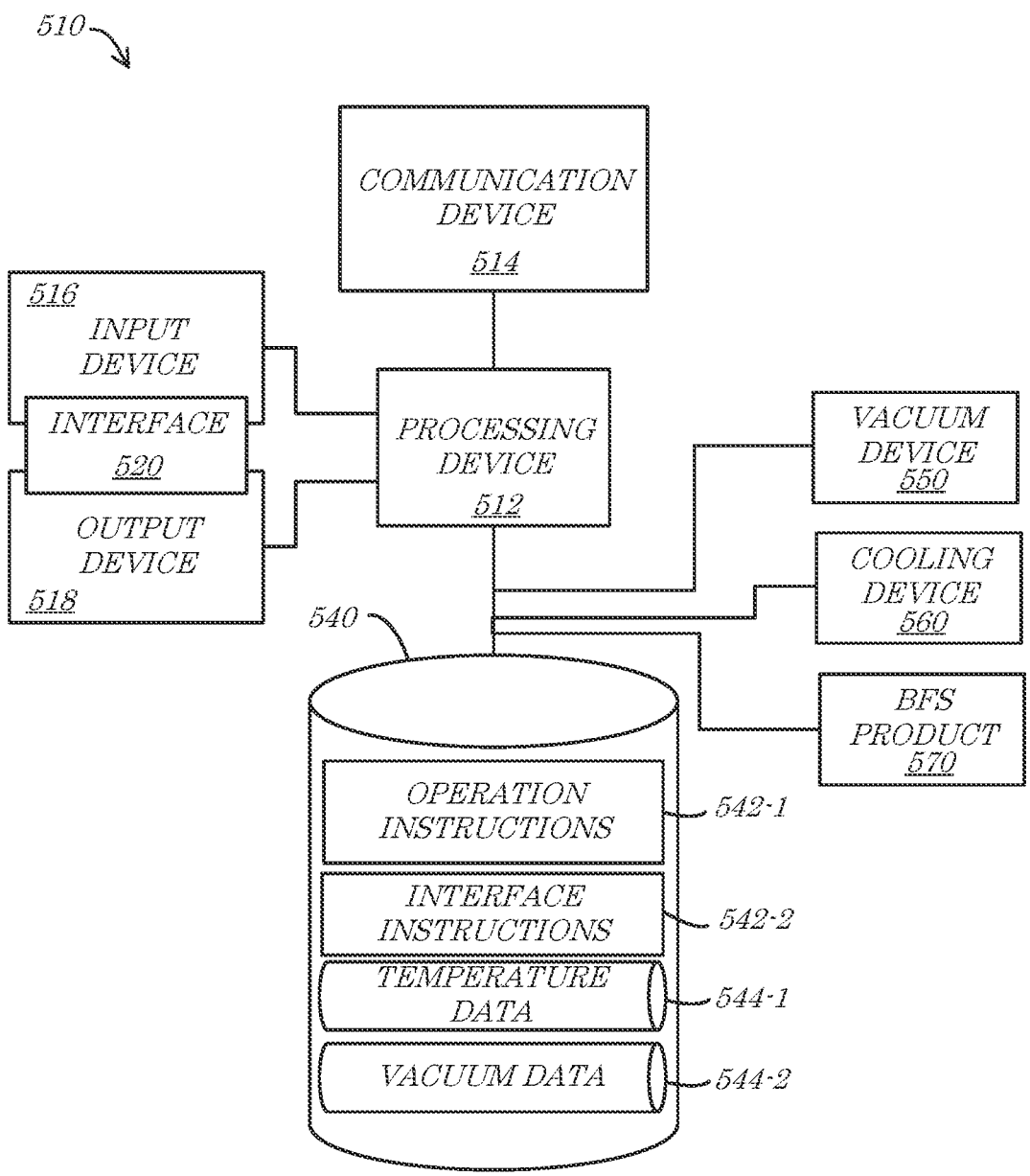
FIG. 5 is a block diagram of an apparatus according to some embodiments.

Referring now to FIG. 4, a flow diagram of a method 400 according to some embodiments is shown. In some embodiments, the method 400 may be performed and/or implemented by and/or otherwise associated with one or more specialized and/or specially-programmed computing devices, computer terminals, computer servers, computer systems and/or networks, and/or any combinations thereof (e.g., by one or more multi-threaded and/or multi-core processing units of a rotary BFS manufacturing system). In some embodiments, the method 400 may be embodied in, facilitated by, and/or otherwise associated with various input mechanisms and/or interfaces.

Figure 6A:
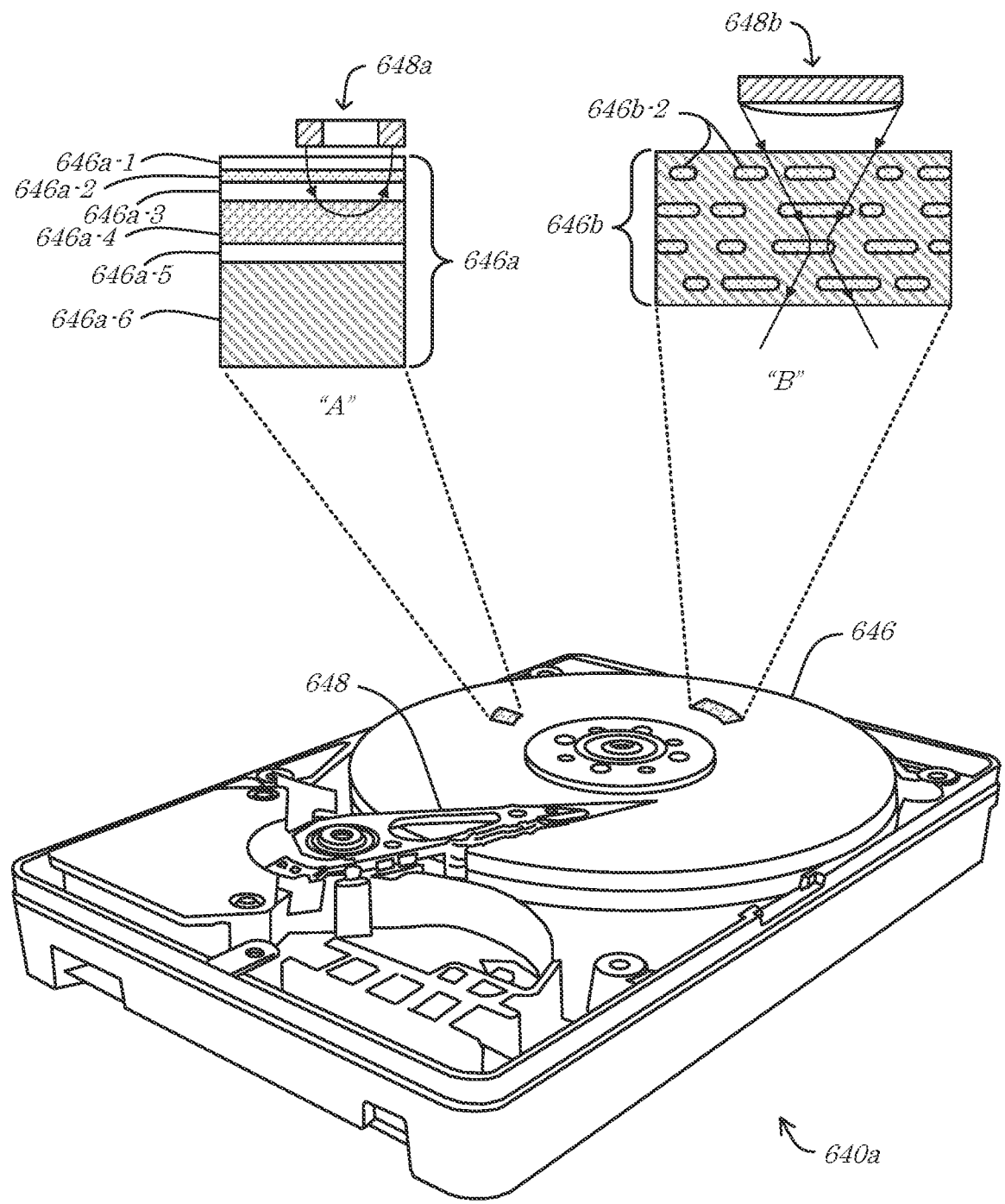
FIG. 6A, FIG. 6B, FIG. 6C, FIG. 6D, and FIG. 6E are perspective diagrams of exemplary data storage devices according to some embodiments.
Figure 6B:
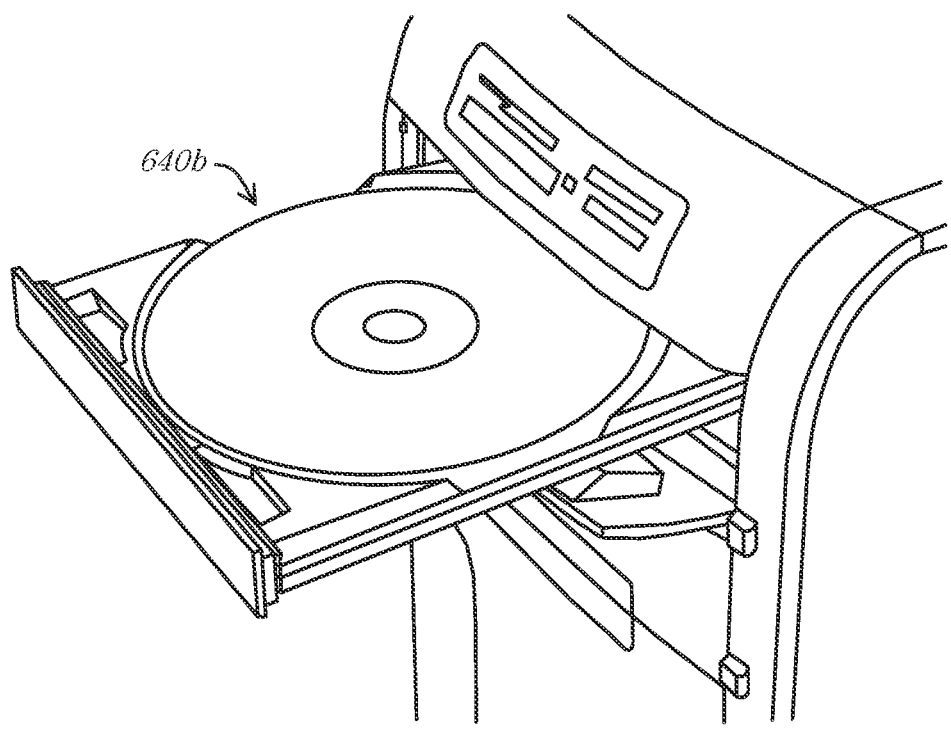
Figure 6C:
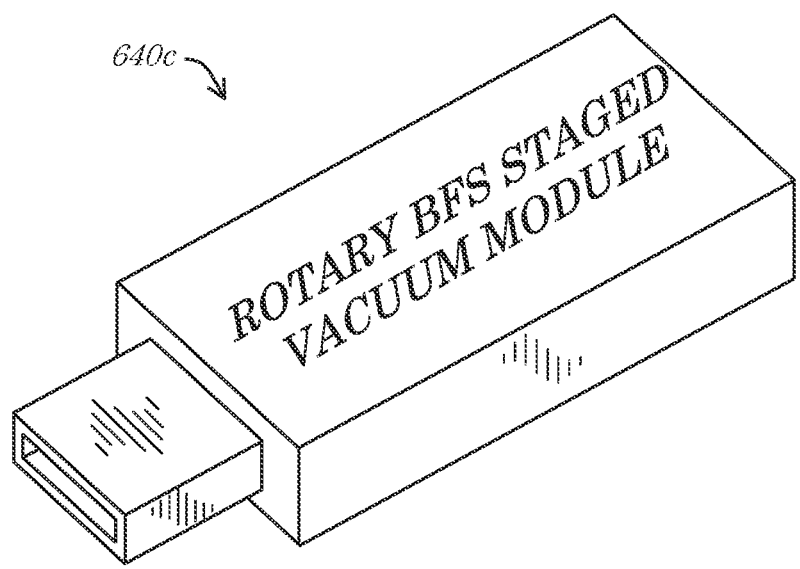
Figure 6D:
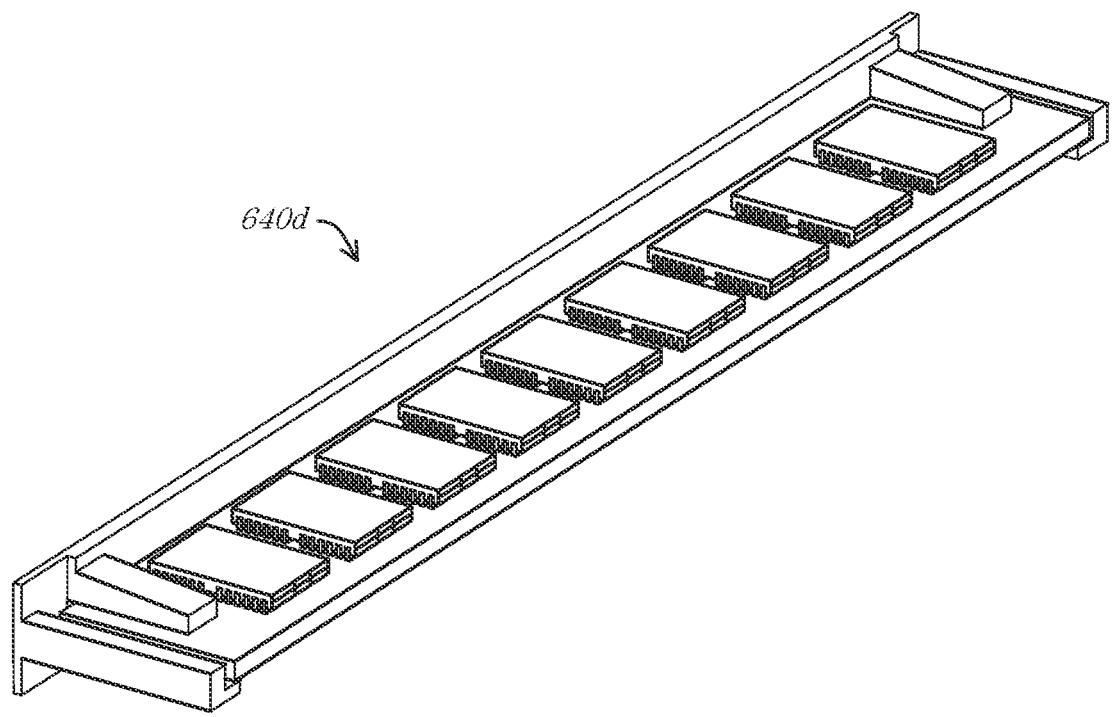
Figure 6E:
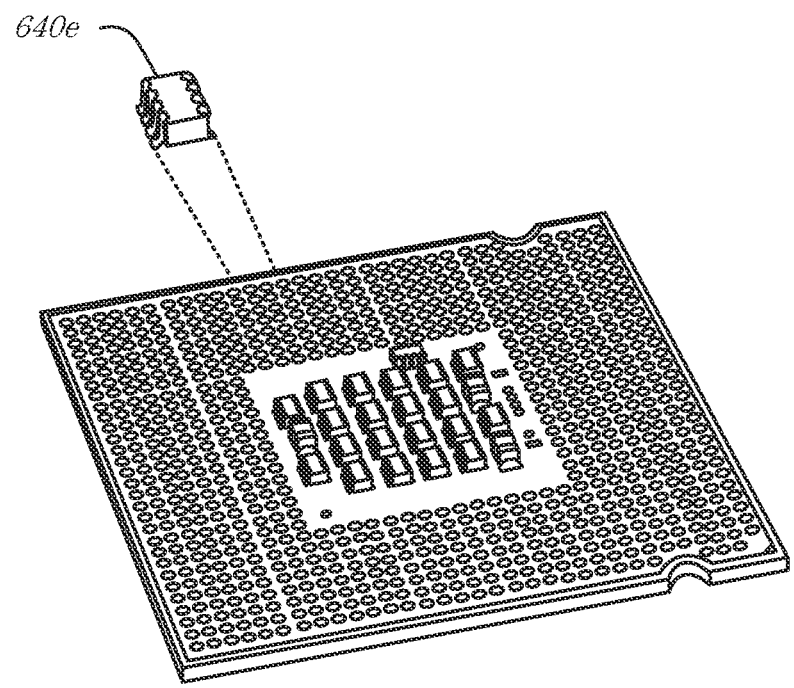

The process diagrams and flow diagrams described herein do not necessarily imply a fixed order to any depicted actions, steps, and/or procedures, and embodiments may generally be performed in any order that is practicable unless otherwise and specifically noted. While the order of actions, steps, and/or procedures described herein is generally not fixed, in some embodiments, actions, steps, and/or procedures may be specifically performed in the order listed, depicted, and/or described and/or may be performed in response to any previously listed, depicted, and/or described action, step, and/or procedure. Any of the processes and methods described herein may be performed and/or facilitated by hardware, software (including microcode), firmware, or any combination thereof. For example, a storage medium (e.g., a hard disk, Random Access Memory (RAM) device, cache memory device, Universal Serial Bus (USB) mass storage device, and/or Digital Video Disk (DVD); e.g., the memory/data storage devices 540, 640a-e of FIG. 5, FIG. 6A, FIG. 6B, FIG. 6C, FIG. 6D, and/or FIG. 6E, herein) may store thereon instructions that when executed by a machine (such as a computerized processor) result in performance according to any one or more of the embodiments described herein.

In some embodiments, the method 400 may comprise applying vacuum (e.g., a first, primary, or "early" vacuum stage or phase) to a first vacuum port of a BFS mold (e.g., at a first time), at 402. A vacuum slider, hose, port, and/or device or system may, for example, selectively apply and/or provide vacuum to the first vacuum port of the BFS mold (and/or the halves thereof) due to a coupling, mating, and/or establishment of communication between the vacuum device and the first vacuum port. In some embodiments, the communication may be established by movement of the mold (and/or mold half), movement of the vacuum device (e.g., a vacuum slider), and/or operation of a switch, solenoid, valve, etc. According to some embodiments, the vacuum device may comprise fixed dimensions and/or placements of vacuum holes, ports, slots, grooves, and/or channels that are placed in and/or along a known travel path of the BFS mold. The vacuum device may be configured with geometries of holes/slots/etc. that work cooperatively with the travel of a moving BFS mold along a predefined path, for example, to supply vacuum at predetermined times during the mold movement cycle.

According to some embodiments, the method 400 may comprise applying the vacuum (e.g., the first stage) to a first portion of the BFS mold (e.g., at the first time), at 404. The mold and/or a mold holder coupled thereto may, for example, be configured such that the first vacuum port is in communication with a first portion of mold areas, cavities, features, etc. In some embodiments, the first portion of the mold (or mold half) may be in communication with the first vacuum port while one or more second portions of the mold may not be in communication with the first vacuum port. According to some embodiments, the first and second portions of the mold may be separated and/or isolated from one another such that one may be subjected to a vacuum force while the other is not.

In some embodiments, the method 400 may comprise applying vacuum (e.g., a second, secondary, or "late" vacuum stage or phase) to a second vacuum port of the BFS mold (e.g., at a second time), at 406. The vacuum slider, hose, port, and/or device or system may, for example, selectively apply and/or provide vacuum to the second vacuum port of the BFS mold (and/or the halves thereof) due to a coupling, mating, and/or establishment of communication between the vacuum device and the second vacuum port. In some embodiments, the communication may be established by movement of the mold (and/or mold half), movement of the vacuum device (e.g., a vacuum slider), and/or operation of a switch, solenoid, valve, etc. According to some embodiments, the vacuum device may comprise fixed dimensions and/or placements of vacuum holes, ports, slots, grooves, and/or channels that are placed in and/or along a known travel path of the BFS mold. The vacuum device may be configured with geometries of holes/slots/etc. that work cooperatively with the travel of a moving BFS mold along a predefined path, for example, to supply vacuum at predetermined times during the mold movement cycle.

According to some embodiments, the method 400 may comprise applying the vacuum (e.g., the second stage) to a second portion of the BFS mold (e.g., at the second time), at 408. The mold and/or a mold holder coupled thereto may, for example, be configured such that the second vacuum port is in communication with a second portion of mold areas, cavities, features, etc. In some embodiments, the second portion of the mold (or mold half) may be in communication with the second vacuum port while one or more other portions (e.g., the first portion) of the mold may not be in communication with the first vacuum port. According to some embodiments, multiple portions of the mold may be separated and/or isolated from one another such that one may be subjected to the vacuum force (e.g., the second stage) while the other(s) is not.

In some embodiments, the method 400 may comprise removing the first stage of vacuum from the first vacuum port of the BFS mold (e.g., at a third time), at 410. The vacuum slider, hose, port, and/or device or system may, for example, selectively deny and/or remove vacuum from the first vacuum port of the BFS mold (and/or the halves thereof) due to an un-coupling, un-mating, and/or removal or breaking of the communication between the vacuum device and the first vacuum port. In some embodiments, the communication may be removed by movement of the mold (and/or mold half), movement of the vacuum device (e.g., a vacuum slider), and/or operation of a switch, solenoid, valve, etc. According to some embodiments, the vacuum device may be configured with geometries of holes/slots/etc. that work cooperatively with the travel of the moving BFS mold along the predefined path to remove the first stage of vacuum at a predetermined time during the mold movement cycle. According to some embodiments, the method 400 may comprise removing the vacuum (e.g., the first stage) from the first portion of the BFS mold (e.g., at the third time), at 412. In the case that the first vacuum port is in communication with the first portion of mold areas, cavities, features, etc., removal of the vacuum from the first vacuum port may accordingly remove or deny the first stage of vacuum from the first portion of the mold (or mold half).

According to some embodiments, the method 400 may comprise removing the second stage of vacuum from the second vacuum port of the BFS mold (e.g., at a fourth time), at 414. The vacuum slider, hose, port, and/or device or system may, for example, selectively deny and/or remove vacuum from the second vacuum port of the BFS mold (and/or the halves thereof) due to an un-coupling, un-mating, and/or removal or breaking of the communication between the vacuum device and the second vacuum port. In some embodiments, the communication may be removed by movement of the mold (and/or mold half), movement of the vacuum device (e.g., a vacuum slider), and/or operation of a switch, solenoid, valve, etc. According to some embodiments, the vacuum device may be configured with geometries of holes/slots/etc. that work cooperatively with the travel of the moving BFS mold along the predefined path to remove the second stage of vacuum at a predetermined time during the mold movement cycle. According to some embodiments, the method 400 may comprise removing the vacuum (e.g., the second stage) from the second portion of the BFS mold (e.g., at the fourth time), at 416. In the case that the second vacuum port is in communication with the second portion of mold areas, cavities, features, etc., removal of the vacuum from the second vacuum port may accordingly remove or deny the second stage of vacuum from the second portion of the mold (or mold half).

While applying and removing two distinct stages or phases of vacuum is described, in some embodiments additional stages and/or phases may also or alternatively be applied, e.g., utilizing additional vacuum ports, slots, grooves, channels, etc. According to some embodiments, different vacuum stages or phases may comprise different levels of applied and/or achieved vacuum. One stage may apply a first level of vacuum to the molds, for example, while a second stage may apply a second level of vacuum that is higher or lower than the first stage.

IV. Rotary BFS Staged Vacuum Manufacturing Apparatus & Articles of Manufacture Turning to FIG. 5, a block diagram of an apparatus 510 according to some embodiments is shown. In some embodiments, the apparatus 510 may comprise, for example, a rotary BFS manufacturing device or system. The apparatus 510 may, for example, execute, process, facilitate, and/or otherwise be associated with the method 400 of FIG. 4 herein, and/or portions thereof. In some embodiments, the apparatus 510 may comprise a processing device 512, a communication device 514, an input device 516, an output device 518, an interface 520, a memory device 540 (storing various programs and/or instructions 542 and data 544), a vacuum device 550, a cooling device 560, and/or a BFS product 570. According to some embodiments, any or all of the components 512, 514, 516, 518, 520, 540, 542, 544, 550, 560, 570 of the apparatus 510 may be similar in configuration and/or functionality to any similarly named and/or numbered components described herein. Fewer or more components 512, 514, 516, 518, 520, 540, 542, 544, 550, 560, 570 and/or various configurations of the components 512, 514, 516, 518, 520, 540, 542, 544, 550, 560, 570 may be included in the apparatus 510 without deviating from the scope of embodiments described herein.

According to some embodiments, the processor 512 may be or include any type, quantity, and/or configuration of processor that is or becomes known. The processor 512 may comprise, for example, an Intel® IXP 2800 network processor or an Intel® XEON™ Processor coupled with an Intel® E7501 chipset. In some embodiments, the processor 512 may comprise multiple inter-connected processors, microprocessors, and/or micro-engines. According to some embodiments, the processor 512 (and/or the apparatus 510 and/or other components thereof) may be supplied power via a power supply (not shown) such as a battery, an Alternating Current (AC) source, a Direct Current (DC) source, an AC/DC adapter, solar cells, and/or an inertial generator. In the case that the apparatus 510 comprises a manufacturing server, necessary power may be supplied via a standard (or high amperage and/or voltage) AC outlet, power strip, surge protector, and/or Uninterruptible Power Supply (UPS) device.

In some embodiments, the communication device 514 may comprise any type or configuration of communication device that is or becomes known or practicable. The communication device 514 may, for example, comprise a Network Interface Card (NIC), a telephonic device, a cellular network device, a router, a hub, a modem, and/or a communications port or cable. According to some embodiments, the communication device 514 may also or alternatively be coupled to the processor 512. In some embodiments, the communication device 514 may comprise an IR, RF, Bluetooth™, Near-Field Communication (NFC), and/or Wi-Fi® network device coupled to facilitate communications between the processor 512 and another device (not separately shown in FIG. 5).

In some embodiments, the input device 516 and/or the output device 518 are communicatively coupled to the processor 512 (e.g., via wired and/or wireless connections and/or pathways) and they may generally comprise any types or configurations of input and output components and/or devices that are or become known, respectively. The input device 516 may comprise, for example, a keyboard that allows an operator of the apparatus 510 to interface with the apparatus 510 (e.g., by manufacturing maintenance and/or control personnel). In some embodiments, the input device 516 may comprise a sensor, such as a temperature sensor, flow sensor, camera, sound, light, radar, RF, and/or proximity sensor, configured to measure and/or record values via signals to the apparatus 510 and/or the processor 512. The output device 518 may, according to some embodiments, comprise a display screen and/or other practicable output component and/or device. The output device 518 may, for example, provide an interface (such as the interface 520) via which functionality for staged vacuum rotary BFS manufacturing is provided. According to some embodiments, the input device 516 and/or the output device 518 may comprise and/or be embodied in a single device, such as a touch-screen monitor.

The memory device 540 may comprise any appropriate information storage device that is or becomes known or available, including, but not limited to, units and/or combinations of magnetic storage devices (e.g., a hard disk drive), optical storage devices, and/or semiconductor memory devices such as RAM devices, Read Only Memory (ROM) devices, Single Data Rate Random Access Memory (SDR-RAM), Double Data Rate Random Access Memory (DDR-RAM), and/or Programmable Read Only Memory (PROM). The memory device 540 may, according to some embodiments, store one or more of operation instructions 542-1, interface instructions 542-2, temperature data 544-1, and/or vacuum data 544-2. In some embodiments, the operation instructions 542-1, interface instructions 542-2, temperature data 544-1, and/or vacuum data 544-2 may be utilized by the processor 512 to provide output information via the output device 518 and/or the communication device 514.

According to some embodiments, the operation instructions 542-1 may be operable to cause the processor 512 to process the temperature data 544-1 and/or vacuum data 544-2 in accordance with embodiments as described herein. Temperature data 544-1 and/or vacuum data 544-2 received via the input device 516 and/or the communication device 514 may, for example, be analyzed, sorted, filtered, decoded, decompressed, ranked, scored, plotted, and/or otherwise processed by the processor 512 in accordance with the operation instructions 542-1. In some embodiments, temperature data 544-1 and/or vacuum data 544-2 may be fed by the processor 512 through one or more mathematical and/or statistical formulas and/or models in accordance with the operation instructions 542-1 to cause the apparatus 510 to produce the BFS product 570 utilizing a rotary BFS staged vacuum application processes, as described herein.

According to some embodiments, the interface instructions 542-5 may be operable to cause the processor 512 to process the temperature data 544-1 and/or vacuum data 544-2 in accordance with embodiments as described herein. Temperature data 544-1 and/or vacuum data 544-2 received via the input device 516 and/or the communication device 514 may, for example, be analyzed, sorted, filtered, decoded, decompressed, ranked, scored, plotted, and/or otherwise processed by the processor 512 in accordance with the interface instructions 542-5. In some embodiments, temperature data 544-1 and/or vacuum data 544-2 may be fed by the processor 512 through one or more mathematical and/or statistical formulas and/or models in accordance with the interface instructions 542-5 to generate an interface that permits an operator of the apparatus 510 to provide input and receive output to conduct rotary BFS staged vacuum manufacturing (e.g., via a Graphical User Interface (GUI)), as described herein.

In some embodiments, the apparatus 510 may comprise the vacuum device 550. The vacuum device 550 may comprise, for example, any type and/or configuration of device that is operable to apply and/or provide a vacuum (e.g., a vacuum force) to the apparatus 510 (e.g., a BFS molding component thereof; not separately shown in FIG. 5). According to some embodiments, the vacuum device 550 may comprise a vacuum slider, a vacuum port, tube, slot, channel, hole, and/or fitting operable to selectively apply multiple time-separated stages of vacuum to the apparatus 510.

According to some embodiments, the apparatus 510 may comprise the cooling device 560. According to some embodiments, the cooling device 560 may be coupled (physically, thermally, and/or electrically) to the processor 512 and/or to the memory device 540. The cooling device 560 may, for example, comprise a fan, heat sink, heat pipe, radiator, cold plate, and/or other cooling component or device or combinations thereof, configured to remove heat from portions or components of the apparatus 510.

In some embodiments, the apparatus 510 may comprise the BFS product 570. The BFS product 570 may, for example, comprise one or more BFS containers, vials, bottles, ampules, and/or other devices or objects manufactured by the apparatus 510. According to some embodiments, the BFS product 570 may comprise one or more BFS containers, vials, bottles, ampules, and/or other devices or objects manufactured (e.g., formed and filled) utilizing a rotary BFS staged vacuum process, as described herein.

Any or all of the exemplary instructions and data types described herein and other practicable types of data may be stored in any number, type, and/or configuration of memory devices that is or becomes known. The memory device 540 may, for example, comprise one or more data tables or files, databases, table spaces, registers, and/or other storage structures. In some embodiments, multiple databases and/or storage structures (and/or multiple memory devices 540) may be utilized to store information associated with the apparatus 510. According to some embodiments, the memory device 540 may be incorporated into and/or otherwise coupled to the apparatus 510 (e.g., as shown) or may simply be accessible to the apparatus 510 (e.g., externally located and/or situated).

Referring to FIG. 6A, FIG. 6B, FIG. 6C, FIG. 6D, and FIG. 6E, perspective diagrams of exemplary data storage devices 640*a-e* according to some embodiments are shown. The data storage devices 640*a-e* may, for example, be utilized to store instructions and/or data such as the operation instructions 542-1, interface instructions 542-2, temperature data 544-1, and/or vacuum data 544-2, each of which is presented in reference to FIG. 5 herein. In some embodiments, instructions stored on the data storage devices 640a-e may, when executed by a processor, cause the implementation of and/or facilitate the methods 400 of FIG. 4 herein, and/or portions thereof.

According to some embodiments, the first data storage device 640a may comprise one or more various types of internal and/or external hard drives. The first data storage device 640a may, for example, comprise a data storage medium 646 that is read, interrogated, and/or otherwise communicatively coupled to and/or via a disk reading device 648. In some embodiments, the first data storage device 640a and/or the data storage medium 646 may be configured to store information utilizing one or more magnetic, inductive, and/or optical means (e.g., magnetic, inductive, and/or optical-encoding). The data storage medium 646, depicted as a first data storage medium 646a for example (e.g., breakout cross-section "A"), may comprise one or more of a polymer layer 646a-1, a magnetic data storage layer 646a-2, a non-magnetic layer 646a-3, a magnetic base layer 646a-4, a contact layer 646a-5, and/or a substrate layer 646a-6. According to some embodiments, a magnetic read head 648a may be coupled and/or disposed to read data from the magnetic data storage layer 646a-2.

In some embodiments, the data storage medium 646, depicted as a second data storage medium 646b for example (e.g., breakout cross-section "B"), may comprise a plurality of data points 646b-2 disposed with the second data storage medium 646b. The data points 646b-2 may, in some embodiments, be read and/or otherwise interfaced with via a laser-enabled read head 648b disposed and/or coupled to direct a laser beam through the second data storage medium 646b.

In some embodiments, the second data storage device 640b may comprise a CD, CD-ROM, DVD, Blu-Ray™ Disc, and/or other type of optically-encoded disk and/or other storage medium that is or becomes know or practicable. In some embodiments, the third data storage device 640c may comprise a USB keyfob, dongle, and/or other type of flash memory data storage device that is or becomes know or practicable. In some embodiments, the fourth data storage device 640d may comprise RAM of any type, quantity, and/or configuration that is or becomes practicable and/or desirable. In some embodiments, the fourth data storage device 640d may comprise an off-chip cache such as a Level 2 (L2) cache memory device. According to some embodiments, the fifth data storage device 640e may comprise an on-chip memory device such as a Level 1 (L1) cache memory device.

The data storage devices 640a-e depicted in FIG. 6A, FIG. 6B, FIG. 6C, FIG. 6D, and FIG. 6E are representative of a class and/or subset of computer-readable media that are defined herein as "computer-readable memory" (e.g., non-transitory memory devices as opposed to transmission devices or media). The data storage devices 640a-e may generally store program instructions, algorithms, software engines, code, and/or modules that, when executed by a processing device cause a particular machine to function in accordance with one or more embodiments described herein.

V. Rules of Interpretation

Throughout the description herein and unless otherwise specified, the following terms may include and/or encompass the example meanings provided. These terms and illustrative example meanings are provided to clarify the language selected to describe embodiments both in the specification and in the appended claims, and accordingly, are not intended to be generally limiting. While not generally limiting and while not limiting for all described embodiments, in some embodiments, the terms are specifically limited to the example definitions and/or examples provided. Other terms are defined throughout the present description.

Neither the Title (set forth at the beginning of the first page of this patent application) nor the Abstract (set forth at the end of this patent application) is to be taken as limiting in any way as the scope of the disclosed invention(s). Headings of sections provided in this patent application are for convenience only, and are not to be taken as limiting the disclosure in any way.

All definitions, as defined and used herein, should be understood to control over dictionary definitions, definitions in documents incorporated by reference, and/or ordinary meanings of the defined terms. The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

The indefinite articles "a" and "an," as used herein in the specification and in the claims, unless clearly indicated to the contrary, should be understood to mean "at least one" or "one or more".

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

Some embodiments described herein are associated with a "user device" or a "network device". As used herein, the terms "user device" and "network device" may be used interchangeably and may generally refer to any device that can communicate via a network. Examples of user or network devices include a PC, a workstation, a server, a printer, a scanner, a facsimile machine, a copier, a Personal Digital Assistant (PDA), a storage device (e.g., a disk drive), a hub, a router, a switch, and a modem, a video game console, or a wireless phone. User and network devices may comprise one or more communication or network components. As used herein, a "user" may generally refer to any individual and/or entity that operates a user device. Users may comprise, for example, customers, consumers, product underwriters, product distributors, customer service representatives, agents, brokers, etc.

As used herein, the term "network component" may refer to a user or network device, or a component, piece, portion, or combination of user or network devices. Examples of network components may include a Static Random Access Memory (SRAM) device or module, a network processor, and a network communication path, connection, port, or cable.

In addition, some embodiments are associated with a "network" or a "communication network". As used herein, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. Networks may be or include a plurality of interconnected network devices. In some embodiments, networks may be hard-wired, wireless, virtual, neural, and/or any other configuration of type that is or becomes known. Communication networks may include, for example, one or more networks configured to operate in accordance with the Fast Ethernet LAN transmission standard 802.3-2002® published by the Institute of Electrical and Electronics Engineers (IEEE). In some embodiments, a network may include one or more wired and/or wireless networks operated in accordance with any communication standard or protocol that is or becomes known or practicable.

As used herein, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard as defined by "Internet Protocol Version 6 (IPv6) Specification" RFC 1883, published by the Internet Engineering Task Force (IETF), Network Working Group, S. Deering et al. (December 1995). Information may, according to some embodiments, be compressed, encoded, encrypted, and/or otherwise packaged or manipulated in accordance with any method that is or becomes known or practicable.

In addition, some embodiments described herein are associated with an "indication". As used herein, the term "indication" may be used to refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

As utilized herein, the terms "program" or "computer program" may refer to one or more algorithms formatted for execution by a computer. The term "module" or "software module" refers to any number of algorithms and/or programs that are written to achieve a particular output and/or output goal—e.g., a 'login credentialing' module (or program) may provide functionality for permitting a user to login to a computer software and/or hardware resource and/or a 'shipping' module (or program) may be programmed to electronically initiate a shipment of an object via a known and/or available shipping company and/or service (e.g., FedEX®). The terms "engine" or "software engine" refer to any combination of software modules and/or algorithms that operate upon one or more inputs to define one or more outputs in an ongoing, cyclical, repetitive, and/or loop fashion. Data transformation scripts and/or algorithms that query data from a data source, transform the data, and load the transformed data into a target data repository may be termed 'data transformation engines', for example, as they repetitively operate in an iterative manner upon each row of data to produce the desired results.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

"Determining" something can be performed in a variety of manners and therefore the term "determining" (and like terms) includes calculating, computing, deriving, looking up (e.g., in a table, database or data structure), ascertaining and the like.

It will be readily apparent that the various methods and algorithms described herein may be implemented by, e.g., appropriately and/or specially-programmed computers and/or computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software A "processor" generally means any one or more microprocessors, CPU devices, computing devices, microcontrollers, digital signal processors, or like devices, as further described herein.

The term "computer-readable medium" refers to any medium that participates in providing data (e.g., instructions or other information) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read.

The term "computer-readable memory" may generally refer to a subset and/or class of computer-readable medium that does not include transmission media such as waveforms, carrier waves, electromagnetic emissions, etc. Computer-readable memory may typically include physical media upon which data (e.g., instructions or other information) are stored, such as optical or magnetic disks and other persistent memory, DRAM, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, computer hard drives, backup tapes, Universal Serial Bus (USB) memory devices, and the like.

Various forms of computer readable media may be involved in carrying data, including sequences of instructions, to a processor. For example, sequences of instruction (i) may be delivered from RAM to a processor, (ii) may be carried over a wireless transmission medium, and/or (iii) may be formatted according to numerous formats, standards or protocols, such as Bluetooth™, TDMA, CDMA, 3G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

The present invention can be configured to work in a network environment including a computer that is in communication, via a communications network, with one or more devices. The computer may communicate with the devices directly or indirectly, via a wired or wireless medium such as the Internet, LAN, WAN or Ethernet, Token Ring, or via any appropriate communications means or combination of communications means. Each of the devices may comprise computers, such as those based on the Intel® Pentium® or Centrino™ processor, that are adapted to communicate with the computer. Any number and type of machines may be in communication with the computer.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

It will be understood that various modifications can be made to the embodiments of the present disclosure herein without departing from the scope thereof. Therefore, the above description should not be construed as limiting the disclosure, but merely as embodiments thereof. Those skilled in the art will envision other modifications within the scope of the invention as defined by the claims appended hereto

What is claimed is:

1. A rotary-style BFS manufacturing system, comprising:
  a BFS mold comprising two cooperatively matched mold halves, each mold half defining a plurality of vacuum cavities;
  a mold holder coupled to each mold half, the mold holders each comprising (i) a first vacuum port in communication with a first subset of the plurality of vacuum cavities of the respective mold half and (ii) a second vacuum port in communication with a second subset of the plurality of vacuum cavities of the respective mold half; and
  a vacuum slider in communication with the mold holder, the vacuum slider comprising two vacuum slots, each vacuum slot being operable to (i) be engaged with the first vacuum port of a respective mold holder at a first time in a rotary BFS cycle and (i) be engaged with the second vacuum port of a respective mold holder at a second time in the rotary BFS cycle.

2. The rotary-style BFS manufacturing system of claim 1, wherein the second vacuum port of each respective mold half is offset vertically from the first vacuum port of the respective mold half.

3. The rotary-style BFS manufacturing system of claim 1, wherein the second vacuum port of each respective mold half comprises a vacuum hole disposed within a vacuum slot.

4. The rotary-style BFS manufacturing system of claim 1, further comprising:
  a controller device in communication with the mold holders; and
  a non-transitory memory device in communication with the controller device, the non-transitory memory device storing instructions that when executed by the controller device result in:
    moving the mold holders along a carousel path in accordance with the rotary BFS cycle, wherein the moving causes, in turn:
      (i) the engagement of the vacuum slots with the first vacuum ports of the respective mold holders at the first time in the rotary BFS cycle; and
      (ii) the engagement of the vacuum slots with the second vacuum ports of the respective mold holders at the second time in the rotary BFS cycle.

5. The rotary-style BFS manufacturing system of claim 4, further comprising:
  a mold positioning system in communication with the controller device, the mold positioning system coupled to at least one of the BFS mold and respective mold holders and operable to selectively alter at least a vertical position of the mold halves and respective mold holders in accordance with the carousel path.

6. The rotary-style BFS manufacturing system of claim 4, further comprising:
  a parison head coupled to a supply of plastic resin and operable to produce a plastic parison, the parison head being in communication with the controller device; and
  a filling mandrel disposed within the parison head and in communication with the controller device.

7. The rotary-style BFS manufacturing system of claim 6, wherein the instructions, when executed by the controller device, further result in:
  molding at least one BFS product by closing the BFS mold to engage the plastic parison;
  causing the filling mandrel to be positioned to fill the at least one BFS product;
  filling, by the filling mandrel, the at least one BFS product with a fluid product; and
  sealing the at least one BFS product.

8. A rotary-style BFS staged vacuum manufacturing method, comprising:
  initiating a rotary BFS molding cycle in which cooperative BFS mold halves are moved to engage with a parison to mold a BFS product;
  molding the BFS product, by:
    (i) applying, at a first time, a first stage of vacuum to a first vacuum port of rotary BFS mold holders coupled to each of the BFS mold halves;
    (ii) moving, after the first time, the BFS mold halves from a first position to a second position of the rotary BFS molding cycle; and
    (iii) applying, at a second time, a second stage of vacuum to a second vacuum port of the rotary BFS mold holders coupled to each of the BFS mold halves;
  filling the molded BFS product with a medicament; and
  sealing the molded and filled BFS product.

9. The method of claim 8, further comprising:
  molding a second BFS product, by:
    (i) applying, at a third time, the first stage of vacuum to the first vacuum port of the rotary BFS mold holders coupled to each of the BFS mold halves;
    (ii) moving, after the third time, the BFS mold halves from the first position to the second position of the rotary BFS molding cycle; and
    (iii) applying, at a fourth time, the second stage of vacuum to the second vacuum port of the rotary BFS mold holders coupled to each of the BFS mold halves;
  filling the second molded BFS product with the medicament; and
  sealing the second molded and filled BFS product.

10. The method of claim 9, wherein the parison is not cut between the molding of the BFS product and the second BFS product, in accordance with the rotary BFS molding cycle.

11. The method of claim 9, wherein the molding of the second BFS product is conducted by second cooperative BFS mold halves.

12. The method of claim 8, wherein the applying of the first and second stages of vacuum is conducted by engaging the BFS mold halves with a fixed-position vacuum slider defining two cooperative vacuum slots.

13. The method of claim 8, wherein the first vacuum ports are in communication with first mold cavities of the cooperative BFS mold halves.

14. The method of claim 8, wherein the second vacuum ports are in communication with second mold cavities of the cooperative BFS mold halves.

15. The method of claim 8, wherein the molding further comprises:
  (iv) removing, at a third time, the first stage of vacuum from the first vacuum port of the rotary BFS mold holders coupled to each of the BFS mold halves; and
  (v) removing, at a fourth time, the second stage of vacuum from the second vacuum port of the rotary BFS mold holders coupled to each of the BFS mold halves.

* * * * *